(12) United States Patent
Kempeneers et al.

(10) Patent No.: US 9,312,676 B2
(45) Date of Patent: Apr. 12, 2016

(54) CABLE SEALING AND RETAINING DEVICE

(71) Applicant: Tyco Electronics Raychem BVBA, Kessel-Lo (BE)

(72) Inventors: Dirk Kempeneers, Aarschot (BE); Bart Vos, Geel (BE); Kristof Vastmans, Boutersem (BE); Danny Willy August Verheyden, Gelrode (BE)

(73) Assignee: CommScope Connectivity Belgium (BE)

( * ) Notice: Subject to any disclaimer, the term of this patent is extended or adjusted under 35 U.S.C. 154(b) by 0 days.

(21) Appl. No.: 14/507,369

(22) Filed: Oct. 6, 2014

(65) Prior Publication Data

US 2015/0115545 A1    Apr. 30, 2015

Related U.S. Application Data

(63) Continuation of application No. 13/575,888, filed as application No. PCT/EP2011/050615 on Jan. 18, 2011, now Pat. No. 8,853,537.

(30) Foreign Application Priority Data

Jan. 29, 2010 (EP) ..................................... 10000925

(51) Int. Cl.
*H02G 15/04* (2006.01)
*G02B 6/44* (2006.01)
(Continued)

(52) U.S. Cl.
CPC ................. *H02G 15/04* (2013.01); *F16J 15/02* (2013.01); *G02B 6/4465* (2013.01);
(Continued)

(58) Field of Classification Search
CPC ....... H02G 15/04; H02G 3/22; H02G 15/007; H02G 15/013; H02G 15/043; H02G 15/10; G02B 6/4465; G02B 6/4471; G02B 6/3887; F16J 15/02
USPC ............ 174/72 A, 77 R, 70 C, 653, 76, 88 R, 174/137 R, 74 R; 277/668, 617, 625, 628; 385/134, 135, 77, 76, 53, 60, 139, 78
See application file for complete search history.

(56) References Cited

U.S. PATENT DOCUMENTS 4,682,848 A    7/1987 Cairns et al.
4,789,351 A    12/1988 Fisher, Jr. et al.
(Continued)

FOREIGN PATENT DOCUMENTS

DE            35 14 010 C1    7/1986
DE    10 2006 033 186 A1    1/2008
(Continued)

OTHER PUBLICATIONS

European Search Report for EP No. 10 00 0925 mailed Jul. 7, 2010.
(Continued)

*Primary Examiner* — Angel R Estrada
(74) *Attorney, Agent, or Firm* — Merchant & Gould P.C.

(57) ABSTRACT

The present invention relates to a cable sealing and retaining device capable of sealingly guiding and retaining a cable through an opening of the cable sealing and retaining device. The present invention provides an improved cable sealing and retaining device which allows a simple releasable fixation of a cable to the cable sealing and retaining device while the cable is sealingly guided through an opening provided with the cable sealing and retaining device. The cable sealing and retaining device (40;60) comprises a sealing part (11) providing a passageway with an inner seal (14) through which a cable (2) is sealingly guidable, and an outer seal (15) arranged on an outer circumference of the sealing part (11). The cable sealing and retaining device (40; 60) comprises a fixation part (12) for retaining the sealing part (11) in longitudinal direction of the passageway; and a sleeve portion (47; 67) forming an opening (41; 61) for receiving the fixation part (12) and the sealing part (11) of the cable sealing and retaining device (40; 60). The sleeve portion (47; 67) provides a sealing section (42; 62) for co-operating with the outer seal (15) to perform a sealing therebetween. The cable sealing and retaining device (40; 60) is characterized by the fixation part (12) which provides fixation means (24) on its outer circumferential surface to fix the fixation part (12) to the sleeve portion (47; 67).

9 Claims, 17 Drawing Sheets

(51) Int. Cl.
  *H02G 15/013* (2006.01)
  *F16J 15/02* (2006.01)
  *H02G 3/22* (2006.01)
  *H02G 15/007* (2006.01)
  *H02G 15/10* (2006.01)

(52) U.S. Cl.
  CPC ........... *G02B 6/4471* (2013.01); *H02G 15/013* (2013.01); *H02G 3/22* (2013.01); *H02G 15/007* (2013.01); *H02G 15/043* (2013.01); *H02G 15/10* (2013.01)

(56) References Cited

U.S. PATENT DOCUMENTS

| | | | |
|---|---|---|---|
| 4,846,714 A | 7/1989 | Welsby et al. | |
| 5,140,207 A | 8/1992 | Baumeister et al. | |
| 5,271,080 A | 12/1993 | Hopper et al. | |
| 5,480,315 A | 1/1996 | Martinelli | |
| 5,598,500 A | 1/1997 | Crespel et al. | |
| 5,670,747 A | 9/1997 | Lawer et al. | |
| 6,206,714 B1 | 3/2001 | Bernardini | |
| 6,542,674 B1 | 4/2003 | Gimblet | |
| 6,546,175 B1 | 4/2003 | Wagman et al. | |
| 6,579,014 B2 | 6/2003 | Melton et al. | |
| 6,648,520 B2 | 11/2003 | McDonald et al. | |
| 6,714,710 B2 | 3/2004 | Gimblet | |
| 6,785,450 B2 | 8/2004 | Wagman et al. | |
| 6,884,113 B1 | 4/2005 | Montena | |
| 6,899,467 B2 | 5/2005 | McDonald et al. | |
| 6,962,445 B2 | 11/2005 | Zimmel et al. | |
| 7,090,406 B2 | 8/2006 | Melton et al. | |
| 7,090,407 B2 | 8/2006 | Melton et al. | |
| 7,090,409 B2 | 8/2006 | Nakajima et al. | |
| 7,111,990 B2 | 9/2006 | Melton et al. | |
| 7,113,679 B2 | 9/2006 | Melton et al. | |
| 7,137,742 B2 | 11/2006 | Theuerkorn et al. | |
| 7,146,090 B2 | 12/2006 | Vo et al. | |
| 7,234,877 B2 | 6/2007 | Sedor | |
| 7,244,066 B2 | 7/2007 | Theuerkorn | |
| 7,264,402 B2 | 9/2007 | Theuerkorn et al. | |
| 7,338,214 B1 | 3/2008 | Gurreri et al. | |
| 7,357,579 B2 | 4/2008 | Feldner | |
| 7,467,896 B2 | 12/2008 | Melton et al. | |
| 7,556,437 B2 | 7/2009 | Droege | |
| 7,572,065 B2 | 8/2009 | Lu et al. | |
| 7,641,398 B2 | 1/2010 | O'Riorden et al. | |
| 7,645,162 B2 | 1/2010 | Kadar-Kallen et al. | |
| 7,744,286 B2 | 6/2010 | Lu et al. | |
| 7,744,288 B2 | 6/2010 | Lu et al. | |
| 7,758,389 B2 | 7/2010 | Kadar-Kallen et al. | |
| 7,762,726 B2 | 7/2010 | Lu et al. | |
| 7,785,015 B2 | 8/2010 | Melton et al. | |
| 7,881,576 B2 | 2/2011 | Melton et al. | |
| 7,918,609 B2 | 4/2011 | Melton et al. | |
| 7,942,587 B2 | 5/2011 | Barnes et al. | |
| 7,942,590 B2 | 5/2011 | Lu et al. | |
| 7,959,361 B2 | 6/2011 | Lu et al. | |
| 7,988,368 B2 | 8/2011 | Sakurai et al. | |
| 8,128,294 B2 | 3/2012 | Lu et al. | |
| 8,202,008 B2 | 6/2012 | Lu et al. | |
| 8,348,518 B2 * | 1/2013 | Katagiyama | G02B 6/3825 385/60 |
| 8,414,196 B2 | 4/2013 | Lu et al. | |
| 8,465,212 B2 | 6/2013 | Bradley | |
| 8,556,520 B2 | 10/2013 | Elenbaas et al. | |
| 8,628,252 B2 | 1/2014 | Matsumoto et al. | |
| 8,746,987 B2 * | 6/2014 | Choi | G02B 6/3887 385/78 |
| 8,853,537 B2 | 10/2014 | Kempeneers et al. | |
| 8,917,967 B2 | 12/2014 | Kempeneers et al. | |
| 2003/0010519 A1 | 1/2003 | Pieck | |
| 2003/0063867 A1 | 4/2003 | McDonald et al. | |
| 2004/0047566 A1 | 3/2004 | McDonald et al. | |
| 2005/0041928 A1 | 2/2005 | Zimmel et al. | |
| 2005/0191910 A1 | 9/2005 | Bertini et al. | |
| 2005/0215101 A1 | 9/2005 | Pepe | |
| 2005/0281510 A1 | 12/2005 | Vo et al. | |
| 2006/0035509 A1 | 2/2006 | O'Connor | |
| 2006/0089049 A1 | 4/2006 | Sedor | |
| 2006/0177181 A1 | 8/2006 | Szilagyi | |
| 2007/0160327 A1 | 7/2007 | Lewallen et al. | |
| 2008/0026647 A1 | 1/2008 | Boehnlein et al. | |
| 2008/0157582 A1 | 7/2008 | Bertele | |
| 2008/0317415 A1 | 12/2008 | Hendrickson et al. | |
| 2009/0148102 A1 | 6/2009 | Lu et al. | |
| 2009/0162016 A1 | 6/2009 | Lu et al. | |
| 2009/0191750 A1 | 7/2009 | Kadar-Kallen et al. | |
| 2010/0215322 A1 | 8/2010 | Matsumoto et al. | |
| 2010/0310213 A1 | 12/2010 | Lewallen et al. | |
| 2010/0322563 A1 | 12/2010 | Melton et al. | |
| 2011/0075971 A1 | 3/2011 | Elenbaas et al. | |
| 2013/0028569 A1 | 1/2013 | Kempeneers et al. | |
| 2014/0037253 A1 | 2/2014 | Elenbaas et al. | |
| 2014/0226937 A1 | 8/2014 | Elenbaas et al. | |

FOREIGN PATENT DOCUMENTS

| | | |
|---|---|---|
| EP | 1 775 610 A2 | 4/2007 |
| EP | 2 239 605 A1 | 10/2010 |
| EP | 2 302 431 A1 | 3/2011 |
| FR | 2 758 017 A1 | 7/1998 |
| GB | 2 030 011 A | 3/1980 |
| JP | 1-134314 | 5/1989 |
| JP | 2007-108741 | 4/2007 |
| JP | 2007-240856 | 9/2007 |
| JP | 2009-109578 | 5/2009 |
| JP | 2011-70191 A | 4/2011 |
| WO | WO 95/34929 A1 | 12/1995 |
| WO | WO 01/59501 A1 | 8/2001 |
| WO | WO 2007/014385 A2 | 2/2007 |
| WO | WO 2007/039585 A1 | 4/2007 |
| WO | WO 2008/157582 A1 | 12/2008 |
| WO | WO 2009/100796 A1 | 8/2009 |

OTHER PUBLICATIONS

European Search Report for EP No. 10 00 0930 mailed Jul. 7, 2010.
International Search Report for International Application No. PCT/EP2011/050615 mailed May 30, 2012.
International Search Report for International Application No. PCT/EP2011/050606 mailed May 30, 2012.

* cited by examiner

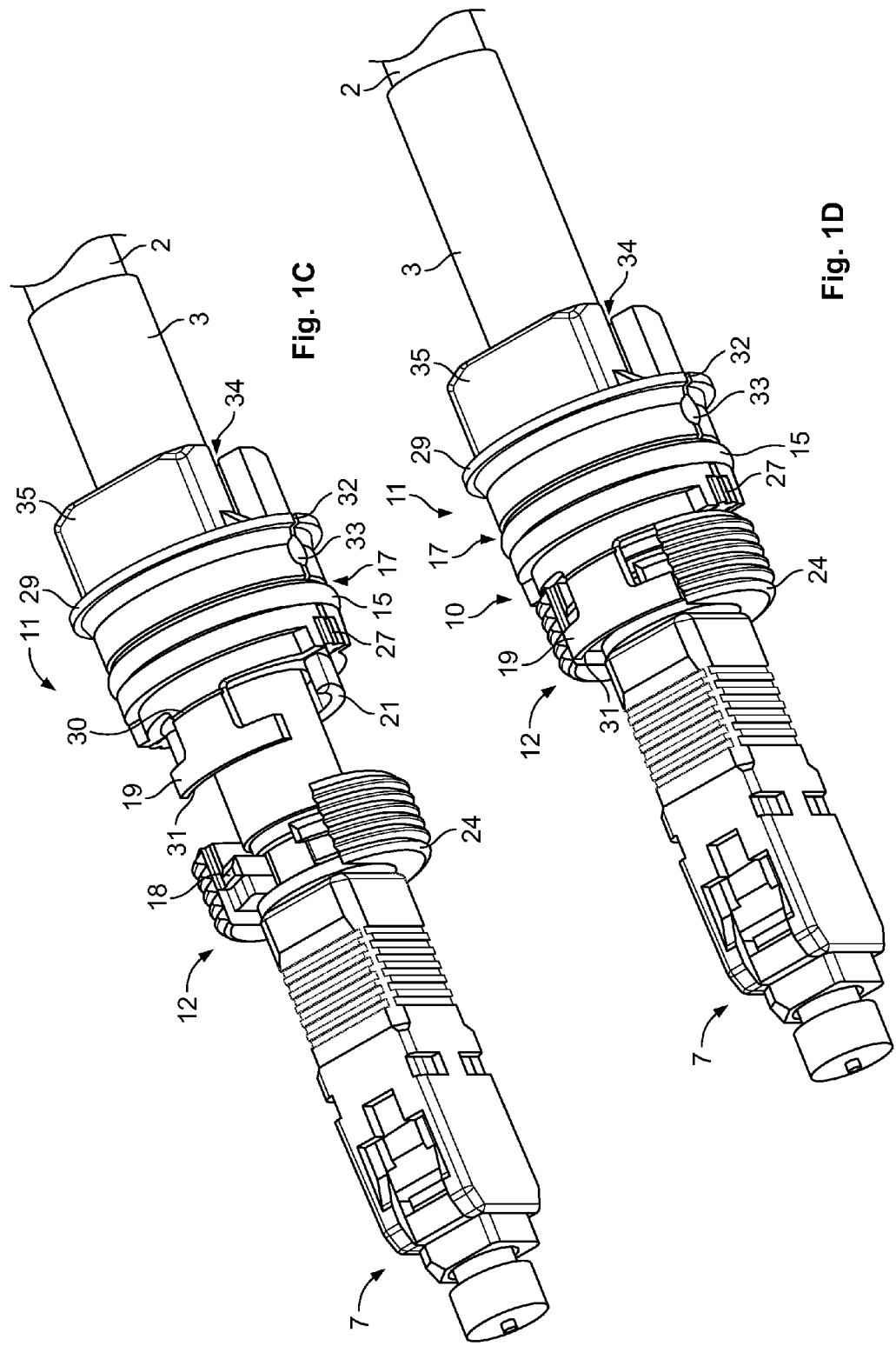

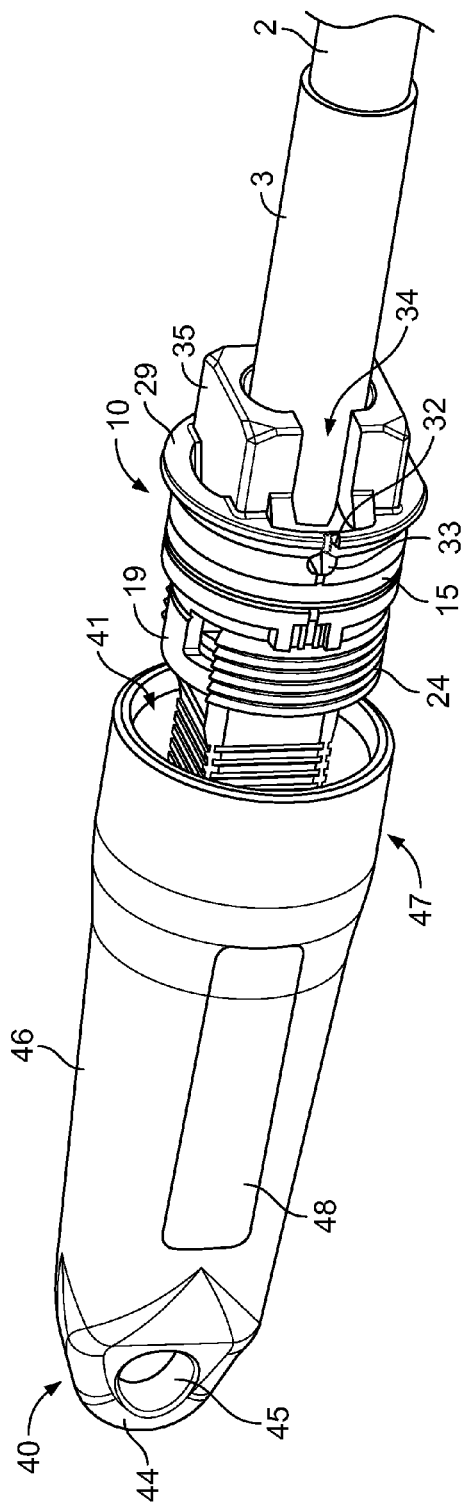
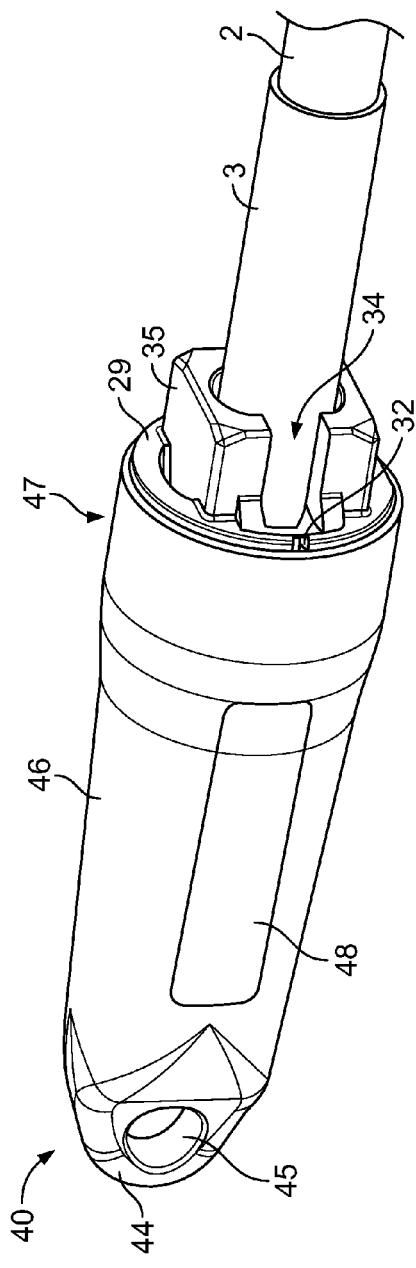
Fig. 2A
Fig. 2B

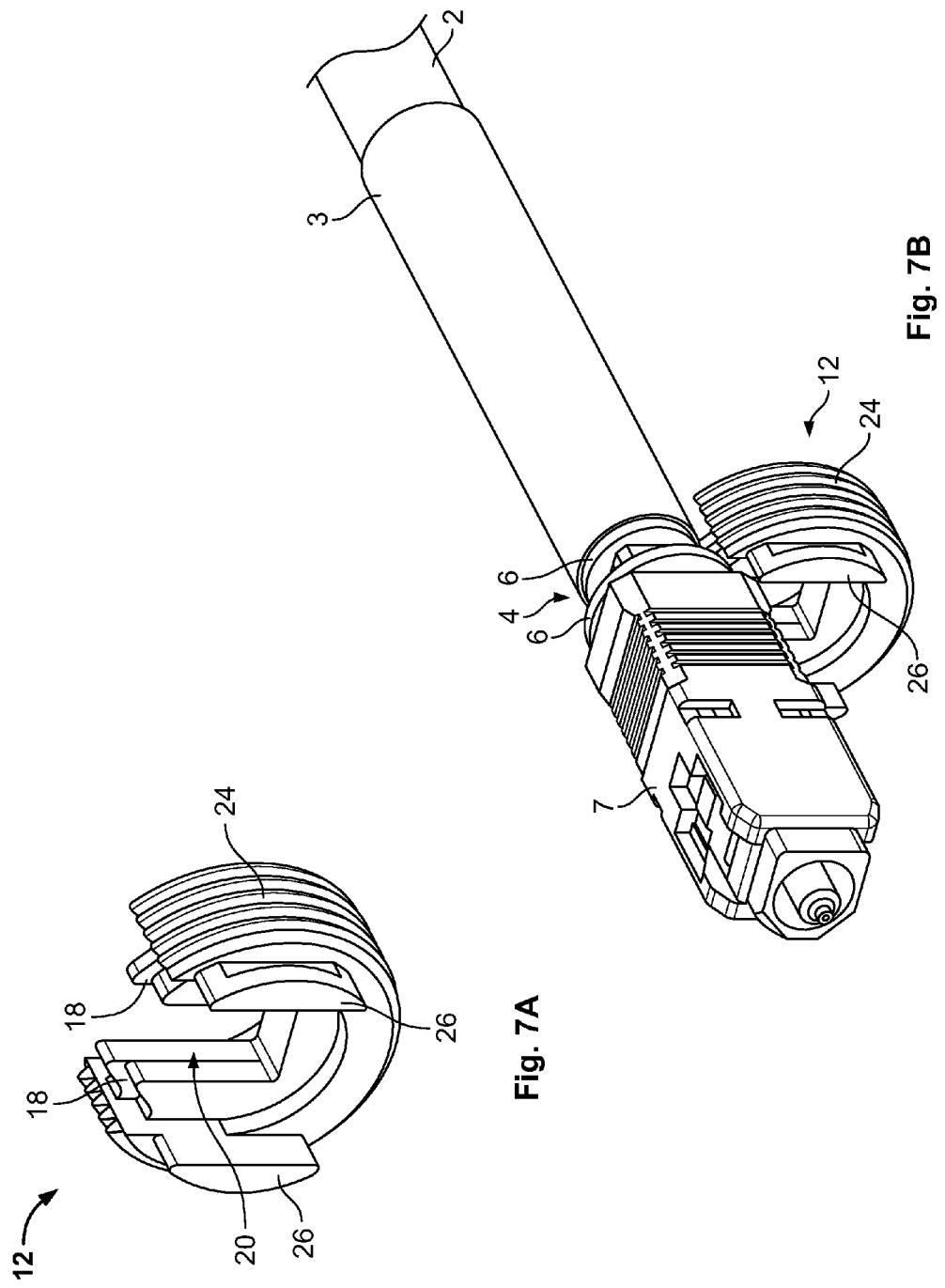

CABLE SEALING AND RETAINING DEVICE

This application is a Continuation of U.S. Ser. No. 13/575,888, filed 27 Jul. 2012, now issued as U.S. Pat. No. 8,853,537, which is a National Stage Application of PCT/EP2011/050615, filed 18 Jan. 2011, which claims benefit of Ser. No. 10000925.7, filed 29 Jan. 2010 in Europe and which applications are incorporated herein by reference. To the extent appropriate, a claim of priority is made to each of the above disclosed applications.

The present invention relates to a cable sealing and retaining device capable of sealingly guiding and retaining a cable through an opening of the cable sealing and retaining device.

A cable sealing and retaining device is e.g. known WO 2007/014385 A2, which finds particular application in the field of telecommunication technology to which the present invention preferably relates.

The known cable sealing and retaining device comprises a sleeve portion forming an opening for guiding therethrough a cable. The sleeve portion has an internal thread which engages with an external thread of a sealing part for retaining the sealing part in the sleeve portion. The sealing part provides a passageway for sealingly guiding therethrough the cable, wherein the passageway forms an entrance at a longitudinal end side of the sealing part and an exit at an opposed longitudinal end side. The entrance has a diameter larger than a diameter of the exit, wherein a step portion forming an abutment surface in longitudinal direction of the passageway is provided between the entrance and the exit. The passageway accommodates a seal ring for sealing the passage of the cable through the passageway and a fixation part for securing the cable to the sealing part, wherein the fixation part is arranged between the abutment surface and the seal ring. The fixation part is formed of a disc-shaped grip means having a central aperture through which the cable extends, wherein the aperture has such a size that the grip means is allowed to grip and, thereby, to be retained on the cable. The fixation part co-operates with a bolt portion screwed in the passageway from the entrance side to press the seal ring against the fixation part and, further, to press the fixation part against the abutment surface. Thereby, the sealing part is secured to the cable, wherein the seal ring is compressed and exerts a pressing force in radial direction towards the sealing part and the cable to provide a sealing therebetween. In order to prevent wear and damage of the inner seal, a washer is arranged between the seal ring and the bolt portion.

Hence, the cable sealing and retaining device can only provide a sealing of the passage of the cable simultaneously with a retaining of the cable to the cable sealing and retaining device. Further, for said retaining feature, the fixation part is required to cooperate with a bolt portion screwed into the passageway after the fixation part, the seal ring and the washer are inserted in the passageway. Accordingly, the sealing part is formed beside the external thread with an internal thread for engaging with the bolt portion. Further, the fixation part, the seal ring, the washer and the bolt portion need to be small shaped to be receivable by the passageway and to prevent a large size of the sealing part. Thus, the small shaped parts of the cable sealing and retaining device complicate a handling thereof when the cable is to be sealed and retained by the cable sealing and retaining device. Furthermore, an assembling of the cable sealing and retaining device requires several steps and, therefore, said assembling is at last time consuming. In addition, in case a sealing or retaining performance is defective or insufficient, all parts are required to be disassembled to locate the defective part.

An object of the present invention is to provide an improved cable sealing and retaining device which allows a simple releasable fixation of a cable to the cable sealing and retaining device while the cable is sealingly guided through an opening provided with the cable sealing and retaining device.

The above object is solved by a cable sealing and retaining device having the features as defined in claim 1. The inventive cable sealing and retaining device is based on the principle that the sealing part and the fixation part are accessible from an outer side. In other words, neither the sealing part nor the fixation part is accommodated by the other part, i.e. The fixation part or the sealing part, respectively. Accordingly, contrary to the known cable sealing and retaining device, the fixation part and the sealing part of the inventive cable sealing and retaining device can be handled as separate parts, each provable with outer means for interacting with other parts of the cable sealing and retaining device. Particularly, in addition to the sealing part being provided with an outer seal for cooperating with the sealing section of the sleeve portion to perform a sealing therebetween, the fixation part is provided with fixation means on its outer circumferential surface to fix the fixation part to the sleeve portion. According to the shape of the fixation part, the sealing part can be simply shaped, as an outer fixation means for securing the sealing part to the cable sealing and retaining device and an inner fixation means for receiving and securing a bolt portion in the passageway can be omitted. Moreover, an assembling of the cable sealing and retaining device can be accelerated, as fewer parts can be provided and as particularly the fixation part may be formed of a size simply to be handle able in comparison with the small size fixation part provided with the known cable sealing and retaining device.

In one preferred embodiment of the inventive cable sealing and retaining device, the fixation part is disposed at a front side of the sealing part to be received by the opening. Particularly, the fixation part and the sealing part are arranged in longitudinal direction juxtaposed with respect to each other. A thus obtained arrangement provides generally in longitudinal direction a front side and a rear side, wherein the front side refers to the side where the fixation part is placed, and wherein the rear side relates to the side where the sealing part is arranged. Thus, a front side direction runs in parallel to a direction extending from the sealing part to the fixation part, wherein a rear side direction runs in parallel with a direction extending from the fixation part to the sealing part. Due to said arrangement, the fixation between the fixation part and the sleeve portion can be also sealed by the sealing part arranged at the rear side and being received by the opening after the fixation part has been received. Moreover, said arrangement allows a separate handling of the fixation part and the sealing part. For instance, in case of an insufficient sealing performance of the sealing part, said sealing part can be removed from the cable sealing and retaining device without necessarily removing the fixation part therefrom to handle the released sealing part by e.g. Replacing the outer and/or inner seal.

In addition, the fixation part has first securing means for cooperating with second securing means provided with the sealing part, wherein the second securing means extend at the front side of the sealing part in longitudinal direction towards the fixation part. Thus, the sealing part is securable against the fixation part in front side direction and in rear side direction. Preferably, the fixation part is disposed directly adjacent to the sealing part for forming an abutment for the sealing part in longitudinal direction. Moreover, the securing formed between the first and second securing means is preferably obtained by positive locking acting at least in longitudinal direction of the passageway. Preferably, the first and second securing means are formed of a latching mechanism providing a latching in longitudinal direction, wherein one of the first and second securing means provides at least one detent and the other one provides at least one corresponding latch. Further preferable, the latching mechanism is formed releasably. More preferable, the latching mechanism is adapted to allow a securing of the sealing part against the fixation part in a secured state of the fixation part. The secured state of the fixation part refers to a state in which the sleeve portion receives the fixation part and in which the fixation part is secured to the sleeve portion. Thereby, the sealing part can be inserted into the opening after the fixation part has already been secured to the sleeve portion. This further improves the possibility of handling the sealing part regardless whether the fixation part is secured or released in the sleeve portion.

In a preferred embodiment, the fixation part has a wrap-around shape to be mountable on the cable from a radial outer side thereof. Preferably, the fixation part is formed of a shape with a passageway for at least partially encompassing the cable in a thereon mounted state. More preferable, the fixation part is C-shaped and, further preferable, made of a single piece. However, other shapes as a U-shape or V-shape are also feasible. The fixation part is preferably formed of a shape suitable for being mounted on the cable from the radial outer side thereof, whereby the C-shape is most preferred. In an alternative embodiment thereto, the fixation part can be preferably formed of two parts connectable to each other from a radial side for forming therebetween the passageway for the cable. Thereby, the fixation part may be mounted on the cable at any position of the cable in longitudinal direction. Further preferable, the fixation part is adapted to be mountable on an attaching portion secured to a cable. Such a cable is e.g. known from WO 2007/039585 A1. Particularly, the attaching part has a connection portion to which strain relief elements of the cable are attached and secured by means of a crimp installed on the connection portion and the thereto attached strain relief elements. Further, for sealing the thus formed connection, a heat shrink is provided on said crimp and partially on the cable. Particularly, the heat shrink extends in longitudinal direction from the attaching part, which projects from one longitudinal free end side of the crimp, to the cable projecting from the opposed longitudinal free end side of the crimp. In addition, the attaching part provides outside the crimp portion a circumferential groove providing a plurality of flat bottom surfaces in circumferential direction of the attaching part. The flat bottom surfaces may be used in the present invention as positive locking faces for retaining in circumferential direction an element mountable thereon. Further, said flat bottom surfaces are sandwiched in longitudinal direction by disc-shaped flanges. In particular, the flanges provide a surface at a longitudinal end side of the groove, wherein the surface extends transverse to the flat bottom surfaces. Said transverse surface may be used in the present invention as positive locking faces for retaining in longitudinal direction the element to be mountable on the attaching part. Due to the present invention, said element is formed by the fixation part which is preferably provided with respective corresponding positive locking faces formed at an inner circumference of the fixation part to cooperate with the positive locking faces of the attaching part. Generally, the fixation part can be adapted to any formation provided with an attaching part connected to a cable. Accordingly, further shapes are thinkable. For instance, one of the attaching part or the fixation part may be preferably provided with a pin projecting from an outer circumference of the attaching part or from an inner circumference of the fixation part towards a radial side, wherein said pin may be preferably received by a corresponding hole provided with the other corresponding part.

Alternatively, in case the cable may not provide an attaching part, the fixation part may be preferably adapted to be mountable on the cable without being secured in longitudinal direction against the cable. Particularly, the fixation part may be adapted to surround the cable by such an extent that the fixation part is radially secured to the cable. Further alternatively, the fixation part may preferably comprise clamping means and/or bonding means to be clamped and/or bonded on the cable, respectively.

According to a further preferred embodiment, the sealing part provides at a rear end side a polygonal shaped end portion, wherein said polygonal shaped end portion comprises two parallel outer surfaces accessible from an outer side in an assembled state of the cable sealing and retaining device. Preferably, the polygonal shaped end portion is cross-sectionally U-shaped with at least two parallel flat outer surfaces which provide working surfaces for supporting the securing of the sealing part in the sleeve portion. For instance, clamping elements may be preferably attached to said working surfaces from a radial outer side to secure the sealing part in longitudinal direction against the sleeve portion. Furthermore, said working surfaces may preferably be used for co-operating with a tool kit attachable on said working surfaces so as to support securing of the sealing part to the cable sealing and retaining device by e.g. Circumferentially moving by means of the tool kit the sealing part secured to the fixation part and further inserting it into the sleeve portion.

In a further preferred embodiment, the fixation part comprises on its outer circumference a thread portion or a bayonet fitting portion adapted to cooperate with an associated thread portion or an associated bayonet fitting portion of the sleeve portion to fix the fixation part to the sleeve portion. Thereby, the fixation part may be fast and reliably secured to and released from the sleeve portion. Furthermore, the fixation provides tension relief in longitudinal direction of the cable. The tension relief may be preferably influenced for the thread engagement by the number of windings selected therefor. Accordingly, the higher the number of windings, the higher the tension relief performance.

Moreover, the bayonet fitting portion may be preferably formed of a commonly known one in the field of telecommunications technology. Exemplary, the bayonet fitting between the fixation part and the sleeve portion may be preferably formed by a male side with one or more pins and a female side with one or more receptors with matching L-slots and one or more springs to keep the bayonet fitting secured together. Particularly, the fixation part provides the pin or the receptor, wherein the sleeve portion provides inside the associated receptor or pin, respectively. The fixation part may be then secured to the sleeve portion in a known manner by aligning the pin and the slot and subsequent pushing them together. Once the pin reach the bottom of the slot, the fixation part is rotated or the fixation part and the sleeve portion are rotated with respect to each other in opposite directions to guide the pin across the bottom of the slot. The spring then holds the pin in position to prevent it from backing out. To disconnect, the fixation part and the sleeve portion are pushed together to overcome the spring whilst twisting slightly to reverse the securing turn.

More preferably, the sleeve portion constitutes an end portion of a housing, which provides an accommodating section adjacent to a fixation section, having the associated thread portion or bayonet fitting portion for sealingly accommodating therein a cable termination guidable by the sealing part.

Further preferable, the cable sealing and retaining device forms a pulling cap of a predetermined length in longitudinal direction, wherein the sleeve portion forms the end portion of the pulling cap which denotes an entrance portion to receive the fixation and sealing part and to allow fixation thereof to the sleeve portion at the entrance of the pulling cap. The accommodating section is adapted to sealingly accommodate the cable termination, which may be preferably formed of a connector. The pulling cap preferably provides at its longitudinal end side opposing the sleeve portion a pulling attachment member providing a pulling eye to which a pulling cable is attachable in order to pull the cable through a duct. According to the above configuration, a simple shaped pulling cap with a sealing and securing performance for a cable termination to be pulled through a duct can be provided. Said configuration can be simply assembled and disassembled. Further, in case no sealing performance is required, the sealing part may be omitted, wherein a weight of the pulling cap receiving the cable termination may be reduced, whereby the pulling cap with the cable termination may be easier pulled through the duct.

In a further preferred embodiment, the housing has flat surface portions on its outer circumference at opposing sides. Said flat surface portions have a predetermined length in longitudinal direction and a predetermined width in circumferential direction of the housing. Preferably, the flat surface portions have a rectangular shape. Said flat surface portions form preferably a contact area for cooperating with a tool kit used to obtain a reliable connection between the housing and the fixation part. Further preferable, the sealing part provides at the rear end side the above described polygonal shaped end portion. Thus, the flat surface portions and said polygonal shaped end portion of the sealing part may be used reliably securing the housing of the pulling cap to the fixation part secured to the sealing part by e.g. applying, for instance by means of tool kits, onto the flat surfaces and the parallel outer surfaces a rotational force acting in opposite directions.

According to a further preferred embodiment, the housing is formed of a cylindrical shaped single body. Thus, a shape of the housing may be further simplified, wherein manufacturing costs therefor can be further decreased.

In a further preferred embodiment, the housing is conical shaped in longitudinal direction of the sleeve portion, wherein the opening has the largest diameter. A conical shape in longitudinal direction refers to a shape having an outer diameter decreasing from the opening towards the opposite longitudinal end side of the housing. According thereto, the sleeve portion, i.e. the boundary of the sleeve portion forming the opening forms a part of the cable sealing and retaining device having the largest diameter. Due to the conical shaped form of the housing with the sleeve portion, the pulling cap can be guided through a duct with a reduced risk of getting jammed in the duct.

According to a further preferred embodiment, the sleeve portion has a longitudinal length corresponding to a longitudinal length of a support portion for the outer seal formed on an outer circumferential surface of the sealing part, and wherein the cable sealing and retaining device provides a lock nut fixable on the fixation part which projects from a longitudinal end side of the sleeve portion in a received state of the fixation part securing the sealing part. More preferable, the sleeve portion forms part of a wall mounting extending transverse to the longitudinal direction of the sleeve portion. According thereto, the sealing and retaining device may be usable in a plurality of applications where a sealingly guiding and securing of the cable from one side of a wall towards the other side is required. Further, by means of the lock nut, the fixation part and the sealing part can be simply released from the sleeve portion of the cable sealing and retaining device.

The present invention will now be described in further detail by referring to preferred embodiments depicted in the accompanying drawings. In these drawings:

FIGS. 1A-1D show a perspective side view of a cable sealing device according to one embodiment in a disassembled and an assembled state;

FIGS. 2A and 2B show a perspective side view of a cable sealing and retaining device according to one embodiment in a disassembled and assembled state with the cable sealing device as shown in FIG. 1D;

FIGS. 7A-7C show a perspective side view of a fixation part of a cable sealing device provided with the cable sealing and retaining device shown in FIGS. 5A-5E, in a pre-installed manner on a cable without and with a sealing part accommodating a ring part;

Figure 1A:
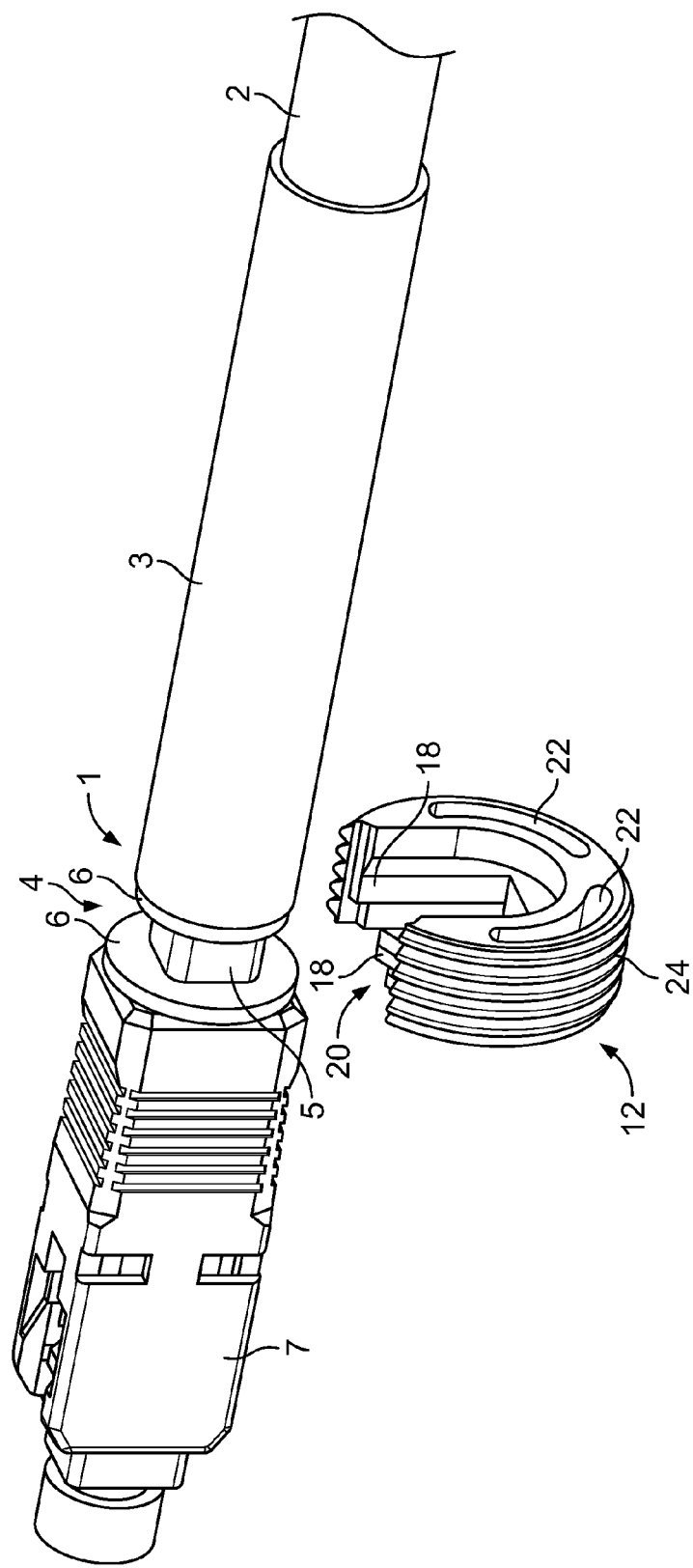

FIGS. 1A to 1D show a perspective side view of a connectorized cable 1 to which the cable sealing device 10 according to an embodiment is attached. Particularly, FIG. 1A shows the connectorized cable 1 which comprises a cable 2 fixed to a connector 7 by an attaching part 4. The connection of the cable 2 to the connector 7 via the attaching part 4 is performed as known e.g. from WO 2007/039585 A1. Accordingly, the attaching part 4 made of a metal component comprises a connection portion (not shown) on which strain relief elements (not shown) provided with the cable 2 are attached and secured by means of a metal crimp (not shown). A heat shrink tube 3 is provided on the metal crimp and the cable 2 to seal the connection therebetween. The attaching portion 4 comprises outside the cable 2 two ring-shaped flanges 6, each providing surfaces directing in longitudinal direction, wherein the inner surfaces sandwich outer circumferential flat surfaces 5 formed by a polygonal shaped body (here a square) and connected to each other in circumferential direction by tapered edges. The surfaces of the flanges 6 and the outer circumferential flat surfaces 5 form positive locking faces. The heat shrink tube 3 ends at one surface side of the flange 6 arranged in longitudinal direction of the cable 2 between the body 5 and the connection portion of the attaching part 4. In this context, an axial direction corresponds to the longitudinal direction of the cable 2, and a radial direction refers to a direction running transverse thereto. A circumferential direction relates to a direction running around the longitudinal direction. The flange 6 provided between the heat shrink tube 3 and the outer circumferential flat surface 5 is disc-shaped and has an outer diameter equal or smaller than an outer diameter of the heat shrink tube 3, thereby providing an abutment surface for the axial end side of the heat shrink tube 3. The cable 2 abuts in axial direction against the connection portion on which the strain relief elements are attached. The opposing flange 6 has a diameter equal or smaller than a diameter of the connector 7 being an SC connector and providing an abutment surface for an axial end side, i.e. a rear side of said connector 7 in axial direction of the connectorized cable 1.

As shown in FIG. 1A, a fixation part 12 forming part of the cable sealing device 10 is adapted to be attachable to the flanges 6 sandwiching the positive locking faces 5. The fixation part 12 is formed of a C-shape and comprises at its outer circumference, an external thread 24. The inner circumference of the fixation part 12 is substantially C-shaped and is divided in its axial direction into three sections. An outer circumference of the axial outer sections adopt a shape of an outer circumference of the flanges 6, respectively. Particularly, each outer section has a ring-segment-shaped bottom formed by a radius corresponding to a radius of the associated flange 6 and is adapted to receive the respective flange 6. From the circumferential ends of said ring-segment-shaped bottom, extend each a straight surface ending at the windings forming the external thread 24. Moreover, the middle section sandwiched by the outer sections is basically U-shaped and adopts the surface profile of the positive locking face 5. The middle section has a width in axial direction of the fixation part 12 corresponding to an axial length of the positive locking face 5 sandwiched by the flanges 6. Particularly, the legs forming the U-shape of the middle section protrudes from the inner circumference of the fixation part 12 such, that the axial end surfaces of the middle section form abutments surfaces for the axial surfaces of the flanges 6 facing the positive locking face 5. Hence, by mounting the fixation part 12 on the attaching part 4, the fixation part 12 is retained in axial direction of the attaching part 4. Additionally, the legs of the middle section extending from the bottom toward the opening 20 form each at their radial outer surface sides a step portion 18 providing thereby first securing means. The first securing means 18 are embedded in the opening 20. Particularly, the end faces of the legs directing to a radial outer side of the fixation part 12 and accommodating the first securing means 18 are arranged at a radial inner side of the fixation part 12 as a bottom of the windings which forms the external thread 24.

Figure 1B:
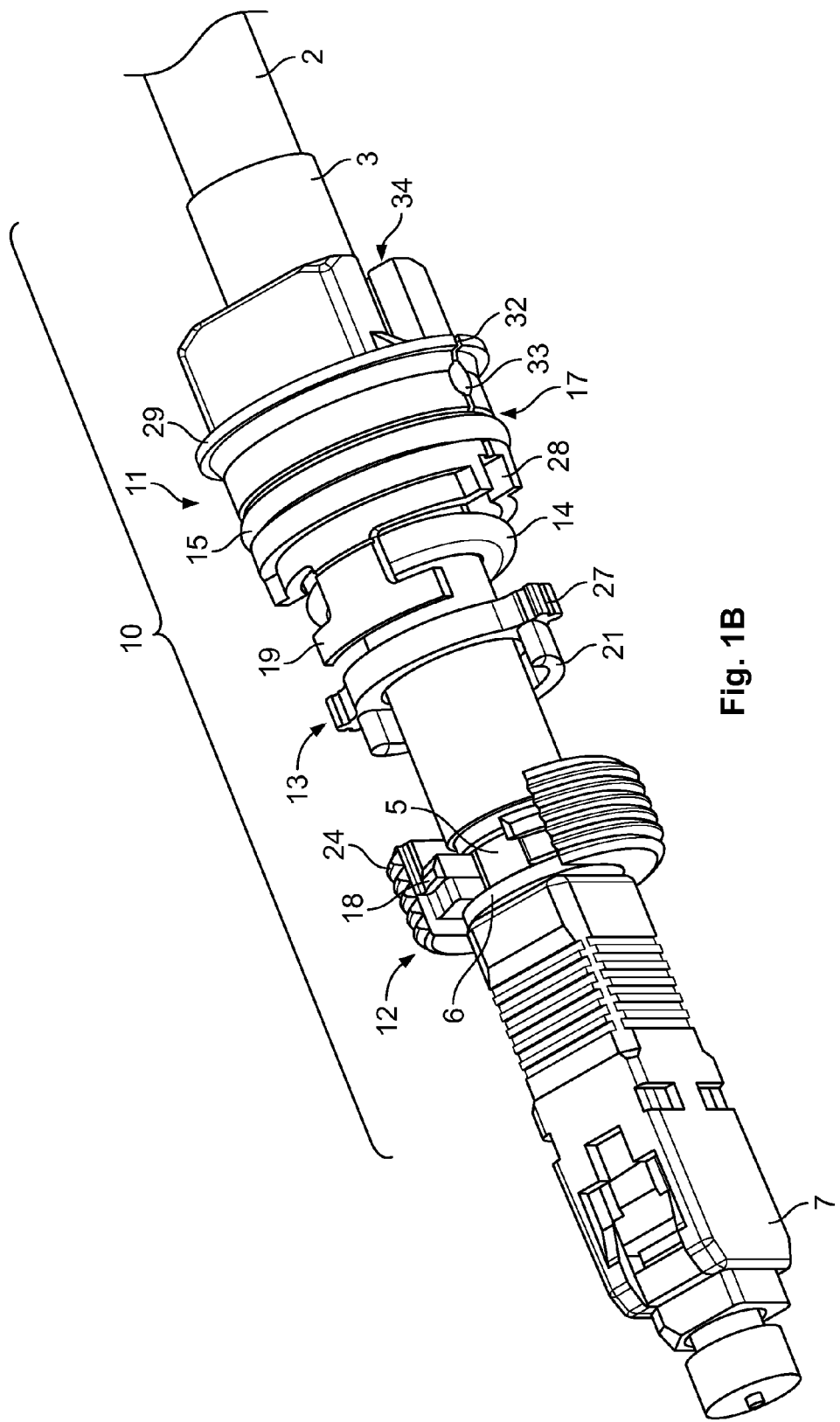

FIG. 1B shows the cable sealing device 10 mounted in its disassembled state on the connectorized cable 1. The cable sealing device 10 comprises the fixation part 12, a sealing part 11 and a ring part 13 provided between the fixation part 12 and an inner seal ring 14. The ring part 13 has longitudinal protrusions 21 projecting from an axial end surface directing to the fixation part 12 to be received in associated notches 22 formed on an axial end surface side of the fixation part 12 directing to the ring part 13, respectively (see FIG. 1A). The ring part 13 further comprises two circumferential projections 27 protruding radially from an outer circumferential surface of the ring part 13 in opposing directions toward an outside. Said circumferential projections 27 cooperate with receptacles 28 provided at respective positions in an axial end surface at a front side of the sealing part 11. The receptacles 28 are shaped correspondingly to the circumferential projections 27 to fully receive the circumferential projections 27 in the assembled state of the cable sealing device 10 and to provide a locking between the fixation part 12 and the ring part 13 in circumferential direction. The circumferential projections 27 provide on its radial surface crush ribs for compensating manufacturing tolerances. The receptacles 28 are opened towards a radial outer direction to expose the crush ribs of the rectangular protrusions in the assembled state.

FIGS. 1B to 1D show the sealing part 11 which is formed substantially of a sleeve having a cylindrical shape at one longitudinal end side relating to the front side, and a rectangular shape at the opposed longitudinal side, referring to a rear side of the sealing part 11, wherein the front side portion merges with the rear side portion at a flange portion 29. The flange portion 29 has an outer diameter larger than an outer diameter of the front side portion providing an outer support portion 17 of the sealing part 11. Said outer support portion 17 has a circumferential groove receiving an outer seal ring 15. The outer seal ring 15 slightly protrudes radially from the outer circumferential surface of the outer support portion 17 in its received state in order to come into contact with a sealing section 42; 52; 62 of a cable sealing and retaining device 40; 50; 60 as described further below. The front side portion of the sealing part 11 comprises the receptacles 28 for receiving the circumferential projections 27 of the ring part 13. At the front side between the receptacles 28, second securing means 19 protrudes axially in front side direction, i.e. away from the flange portion 29 and the rear side.

The second securing means 19 is hammer head shaped, wherein the hammer head projects in circumferential direction the opening 20 defined by the first securing means 18. The hammer head has a circumferential width corresponding to a circumferential opening width defined in circumferential direction by the end faces of the external thread 24. As particularly shown in FIG. 1D, the axial length of the second securing means 19 corresponds to an axial length of the fixation part 12. In the assembled state of the cable sealing device 10, the hammer head is fitted in the circumferential opening defined by the external thread 24. Further, an axial end surface of the second securing means 19 forms with an axial end surface of the fixation part 12, a common surface. On a radial inner side of the second securing means 19, which is the side directing to the axis of the cable sealing device 10, ratchets are provided which engage the step-shaped first securing means 18 of the fixation part 12 in the assembled state of the cable sealing device 10. Thereby, the sealing part 11 is secured to the fixation part 12 in axial direction. Further, as the second securing means 19 is fitted in the assembled state of the cable sealing device 10 in the circumferential opening defined by the external thread 24, circumferential end faces of the second securing means 19 abut against circumferential end surfaces of the external thread 24, whereby the securing of the sealing part 11 in circumferential direction is further improved. Additionally, the first securing means 18 (FIG. 1C) and the second securing means 19 comprise sliding surfaces formed by tapered edges provided at the sides of the step-formed first securing means 18 facing the second securing means 19 and at the ratchets of the second securing means 19 facing the first securing means 18, respectively. Moreover, the second securing means 19 has a circumferential extending incision 30 provided at the transition from the outer support section 17 to the second securing means 19 by which the second securing means 19 is improved to be elastically pivotable about incision 30 in radial direction of the sealing part 11. By connection of the sealing part 11 to the fixation part 12, the second securing means 19 slides with its tapered edges over the tapered edges of the first securing means 18, wherein the ratchets of the second securing means 19 engage behind the radial extending surface of the step-formed first securing means 18 in the assembled state of the cable sealing device 10 to axially fix the sealing part 11 to the fixation part 12. The second securing means 19 has a further tapered section formed on the radial inner side at a longitudinal free end side, whereby the longitudinal free end side provides a handle able tip end 31 to allow manually disassembling of the sealing part 11 from the fixation part 12 by lifting the tip end 31 in radial outside direction and, thereby, releasing the second securing means 19 from the first securing means 18.

The sealing part 11 has a breakage zone formed by an incision 32 extending on the circumferential outer surface of the sealing part 11 in longitudinal direction. The sealing part 11 provides a cavity 33, which intersects the breakage zone 32 in the area of the outer support portion 17. The breakage zone 32 has such a depth that the sealing part 11 can be released from the connectorized cable 1 by breaking the sealing part 11 along the breakage zone 32. The breakage may be conducted e.g. by means of a lever insertable into the cavity 33. As shown in FIGS. 1B to 2A, the breakage zone 32 extends axially over the whole longitudinal length of the sealing part 11. That is, the breakage zone 32 extends from the flange portion 29 towards the front side until the receptacles 28, and from the flange portion 29 towards the rear side of the sealing part 11 which is basically U-shaped and forming securing formations 35 on an outer circumference with a gap 34 provided in elongation of the breakage zone 32.

Figure 3:
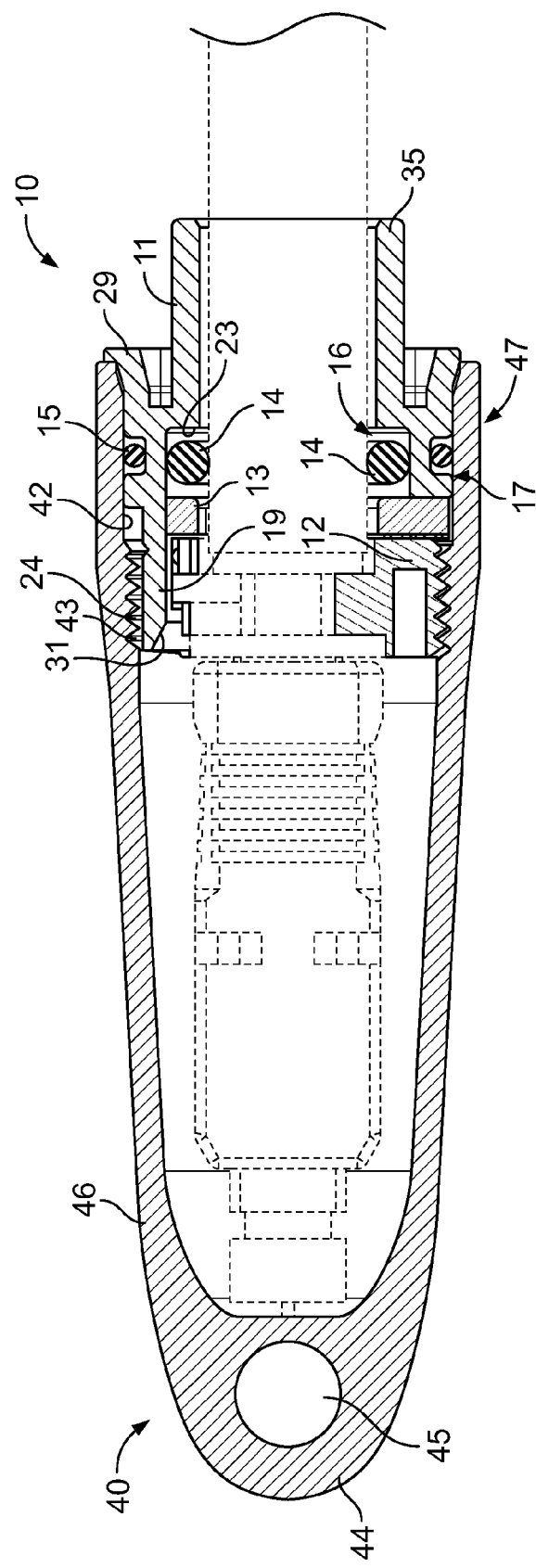
FIG. 3 shows a cross-sectional view of the cable sealing and retaining device with the cable sealing device as shown in FIG. 2B.
Figure 4A:
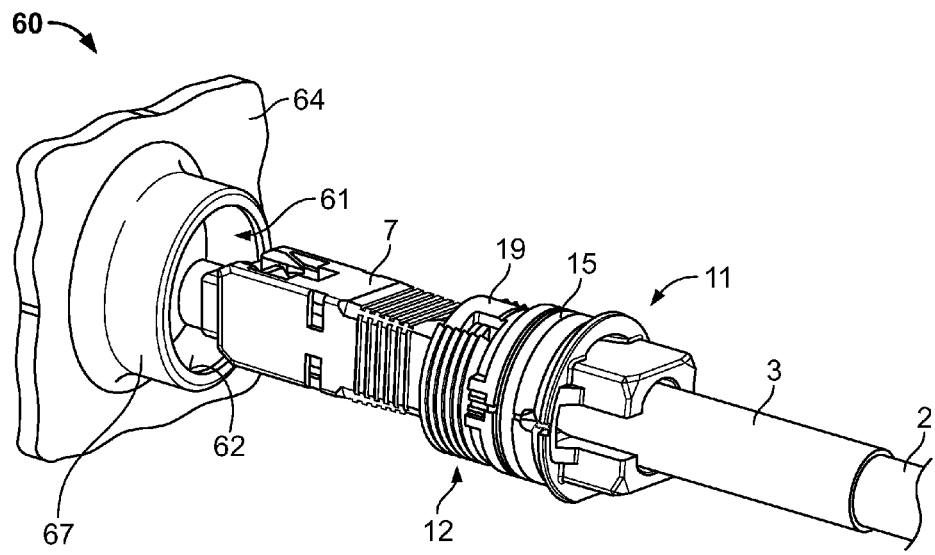
FIGS. 4A-4D show a perspective side view of a cable sealing and retaining device according to another embodiment in a disassembled and assembled state with the cable sealing device as shown in FIG. 1D.
Figure 4B:
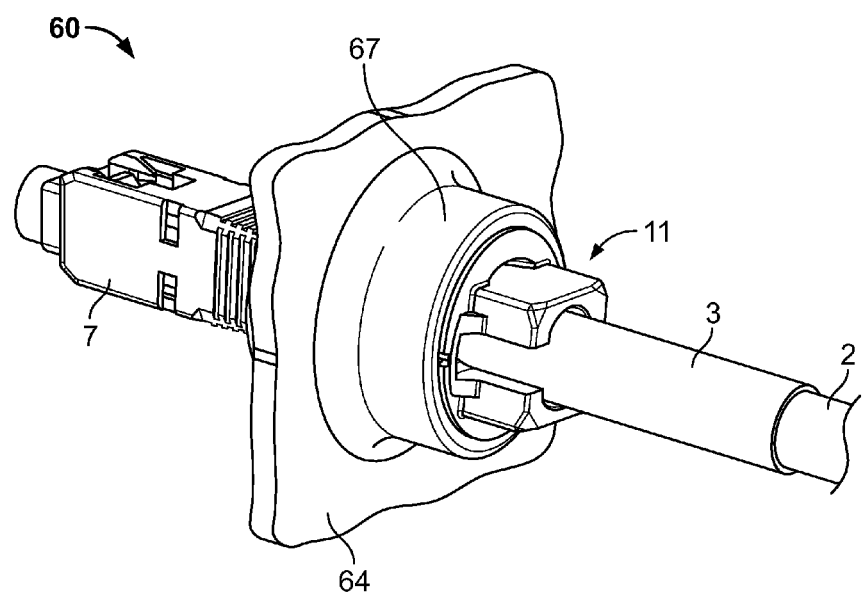
Figure 4C:
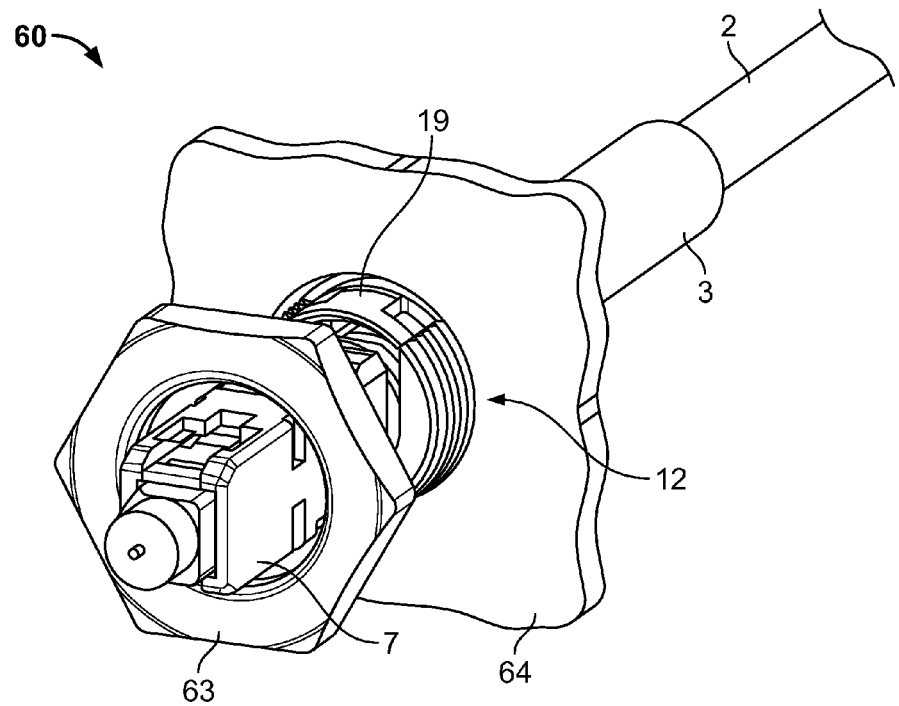
Figure 4D:
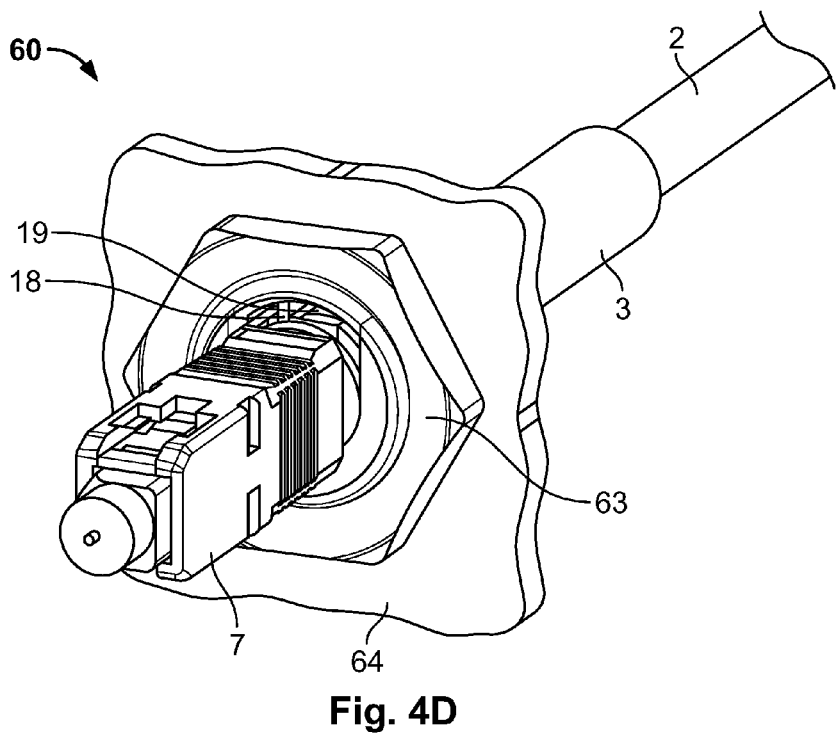

FIGS. 2A and 2B show a perspective side view of a cable sealing and retaining device 40 according to an embodiment in its disassembled and assembled state with the cable sealing device 10. FIG. 3 shows a cross-sectional view in longitudinal direction of said cable sealing and retaining device 40 connected to the cable sealing device 10.

The cable sealing and retaining device constitutes a pulling cap 40 formed by injection moulding plastic material and providing an opening 41 at one longitudinal end side, which denotes the rear side and a pulling attachment member 44 at its opposed longitudinal end side, which constitutes the front side. The pulling attachment member 44 is provided at the front side of the housing 46 and forms a round-shaped tip end for the pulling cap 40, wherein a pulling eye formed of a through-hole 45 is provided transverse to the longitudinal direction of the pulling cap 40. Said pulling attachment member 44 with its pulling eye 45 is provided for being attachable to a pulling device to pull the pulling cap 40 through a duct.

The pulling cap 40 provides a housing 46 of a cylindrical shaped single body. The housing 46 is further conical shaped in longitudinal direction of a sleeve portion 47 provided at a rear end side of the housing 46 and forming the opening 41 having the largest diameter. The housing 46 has flat surface portions 48 on its outer circumference at opposing sides. The flat surface portions 48 of a rectangular shape extend in longitudinal direction by a predetermined length and in circumferential direction by a predetermined width. The flat surface portions 48 provide working surfaces engageable for instance with engaging surfaces of a tool kit like a screw-wrench for supporting fixation of the pulling cap 40 with the cable sealing device 10. The housing 46 has a longitudinal length capable of accommodating inside of the housing 46 in an accommodating section 49 the connector 7 and the parts of the cable sealing device 10 ranging from the fixation part 12 to the flange portion 29. Particularly, the longitudinal free end surface of the sleeve portion 47 surrounding the opening 41 provides an abutment surface for the flange portion 29 in longitudinal direction such that the longitudinal surface of the flange portion 29 abuts against the abutment surface of the sleeve portion 47 in the assembled state of the pulling cap 40 with the cable sealing device 10, whereby the securing formations 35 at the rear side of the cable sealing device 10 extend from the rear end side of the pulling cap 40 in longitudinal direction. Accordingly, the securing formations 35 can be also used for supporting the fixation of the pulling cap 40 with the cable sealing device 10 by means of a screw-wrench as described above. The sleeve portion 47 provides a sealing section 42 arranged adjacent to the opening 41 to be sealingly contacted in the assembled state by the outer seal 15 as shown in FIG. 3. Further inside of the housing 46 adjacent to the sealing section 42, the housing 46 comprises an internal thread 43 cooperating with the external thread 24 of the fixation part 12. Particularly, the cable sealing device 10 is screwable into the pulling cap 40 by engagement of the internal thread 43 and the external thread 24.

Alternatively to the thread engagement, a bayonet mount (not shown) may be provided, wherein a male pin and a female slot may be appropriately positioned at the fixation part 12 and the sleeve portion 47, respectively. Exemplary, the internal and external threads 43, 24 may be replaced with the pin and the slot, respectively, wherein one of the fixation part 12 and the sleeve portion 47 provide the pin and the other one the slot. The insertion depth of the cable sealing device 10 is defined by the abutment of the flange portion 29 with the abutment surface of the sleeve portion 47 surrounding the opening 41 and/or, for instance, by the number of windings provided with the internal and/or external thread 43, 24, respectively, whereby a predetermined longitudinal length of said threads 43, 24 is defined.

With reference to FIG. 3, a configuration of the inner sealing portion 16 of the sealing part 11 according to this embodiment will now be described. The sealing part 11 provides a passageway through which the cable 2 covered by the heat shrink tube 3 is guided. The passageway is substantially divided into a front section and a rear section. The rear section extends from the rear side of the sealing part 11 towards the front side until a step provided at a position radially below the outer support portion 17 is reached, wherein said rear section has an inner diameter slightly larger than an outer diameter of the heat shrink tube 3 to allow guiding of the cable 2 with the heat shrink tube 3 provided at the end thereof through said passageway. The front section arranged in longitudinal direction adjacently to the rear section extends from the rear section to the front side of the sealing part 11, i.e. from the step to a transverse plane containing the circumferential incision 30 provided at the transition between the outer support portion 17 and the longitudinal end of the neck of the hammerhead shaped second securing means 19. The front section forms the inner support section 16. Said inner support section 16 has an inner diameter larger than an inner diameter of the rear section. The step provided between the rear and front sections forms a cavity 23 opened to the front side, i.e. to the side facing the fixation part 12, and to the passageway to accommodate the inner seal ring 14. The inner seal ring 14 is mounted on the heat shrink tube 3 which forms part of the cable 2. Due to the connection portion of the attaching part 4 extending below the inner seal ring 14, said inner seal ring 14 is further supported by the attaching portion 4. Moreover, the inner seal ring 14 has an outer diameter larger than an inner diameter of the cavity 23. Hence, the inner seal ring 14 applies a pressing force in radial directions in a received state in the cavity 23, i.e. toward the passageway and toward the sealing part 11. Due to the dimension of the inner seal ring 14 with respect to the cavity 23, the sealing part 11 is further securable on the cable 2 by the pressure applied by the inner seal ring 14 in its received state. Moreover, tolerances between the inner seal ring 14 and the cable 2 may be compensated to obtain a reliable sealing therebetween.

In the assembled state of the cable sealing device 10, by which the fixation part 12 and the sealing part 11 are secured to each other, the ring part 13 forms an abutment for the inner seal ring 14 at its front end to prevent a flowing of the inner seal ring 14 material, being a material suited for obtaining sealing performance such as rubber, gel, mastic and the like, out of the cavity 23.

A connection of the cable sealing device 10 with the connectorized cable 1 can be achieved as follows. At first, the sealing part 11 with the inner seal ring 14 and the ring part 13 are mounted on the cable 2 not provided with the attaching part 4. Then, the axial end of the cable 2 is connected to the attaching part 4 by a common connection method using a crimp means and a heat shrink tube 3. Subsequent thereto, the fixation part 12 is mounted on the positive locking faces 5, 6 of the attaching part 4. Particularly, the fixation part 12 is secured to the positive locking faces 5, 6 from a radial outer side. The fixation part 12 is thereby retained in circumferential direction and in longitudinal direction. The ring part 13 is then moved in longitudinal direction towards the fixation part 12 and secured thereto by inserting the longitudinal protrusions 21 into the notches 22. Thus, the ring part 13 is secured against the fixation part 12 in circumferential direction. Thereafter, the sealing part 11 is secured to the fixation part 12 by moving the sealing part 11 in longitudinal direction, i.e. in its axial direction towards the fixation part 12 and connecting the second securing means 19 to the first securing means 18. The sealing part 11 is retained by the fixation part 12 in longitudinal direction by means of positive locking formed between the first and second securing means 18, 19 in longitudinal direction and in circumferential direction by means of positive locking formed between the circumferential end surfaces of the fixation part 12 and the second securing means 19. Furthermore, the longitudinal protrusions 21 of the ring part 13 are received by the notches 22 of the sealing part 11, whereby a positive locking in circumferential direction is achieved between the sealing part 11 and the ring part 13. Accordingly, the sealing part 11 is secured in circumferential direction by the positive locking formed between the longitudinal protrusions 21 and the notches 22 and further by the first and second securing means 18, 19, wherein the fixation part 12 is fixed on the attaching part 4 in circumferential and in longitudinal directions. Hence, the cable sealing device 10 is secured against the attaching part 4 in circumferential direction and in longitudinal direction in its assembled state. Moreover, the inner seal ring 14 is retained in the cavity 23 of the sealing part 11 in longitudinal direction toward the fixation part 12 by the ring part 13. At last, in case of need, the connector 7 is connected to the attaching part 4. However, the connector 7 does not necessarily need to be mounted on the attaching part 4. The connector 7 may be mounted on the attaching part 4 at any stage after fixing the attaching part 4 to the cable 2.

The cable sealing device 10 is removable from the connectorized cable 1 in a reversed order. Thereby, the sealing part 11 may be removed from the connectorized cable 1 by breaking the breakage zone 32 and by bending the opened sealing part 11 so as to be removable from the cable 2. Thereby, the connection of the connectorized cable 1 formed between the connector 7, the attaching part 4 and the cable 2 does not need to be necessarily opened.

FIGS. 4A to 4D show a perspective side view of a cable sealing and retaining device 60 according to another embodiment in a disassembled and assembled state with the cable sealing device 10. The cable sealing and retaining device 60 forms a wall mounting 64 formed integrally with a sleeve portion 67 extending perpendicular from a front side surface of the wall mounting 64. The sleeve portion 67 provides a through-hole extending through the wall mounting 64 and forms at one longitudinal end side an opening 61 which receives the cable sealing device 10. The sleeve portion 67 has a length in longitudinal direction corresponding to a longitudinal length of the outer support portion 17 supporting the outer seal 15. Further, the sleeve portion 67 merges at a rear side of the wall mounting 64, which is the side opposing the side from which the sleeve portion 67 extends, with said rear side surface of the wall mounting 64 so as to form a common rear surface.

In an assembled state of the cable sealing and retaining device 60 with the cable sealing device 10, the fixation part 12 projects with the fixation means 24 from the rear side of the wall mounting 64 to be accessible from said rear side. The cable sealing and retaining device 60 further comprises a polygonal-shaped lock nut 63 which is screwed on the fixation part 12 from the rear side of the wall mounting 64. Thereby the cable sealing device 10 is fixed to the cable sealing and retaining device 60. Particularly, the securing formations 35 projects from the sleeve portion 67 in longitudinal direction thereof at the front side of the wall mounting 64. The securing formations 35 provide two parallel extending outer flat surfaces which can be used as a bolt portion. Accordingly, the fixation of the cable sealing device 10 to the cable sealing and retaining device 60 may be conducted and, thereby, further improved by screwing the lock nut 63 onto the fixation part 12, while holding the securing formations 35 of the sealing part 11, i.e. the cable sealing device 10, by means of a screw-wrench.

Figure 6:
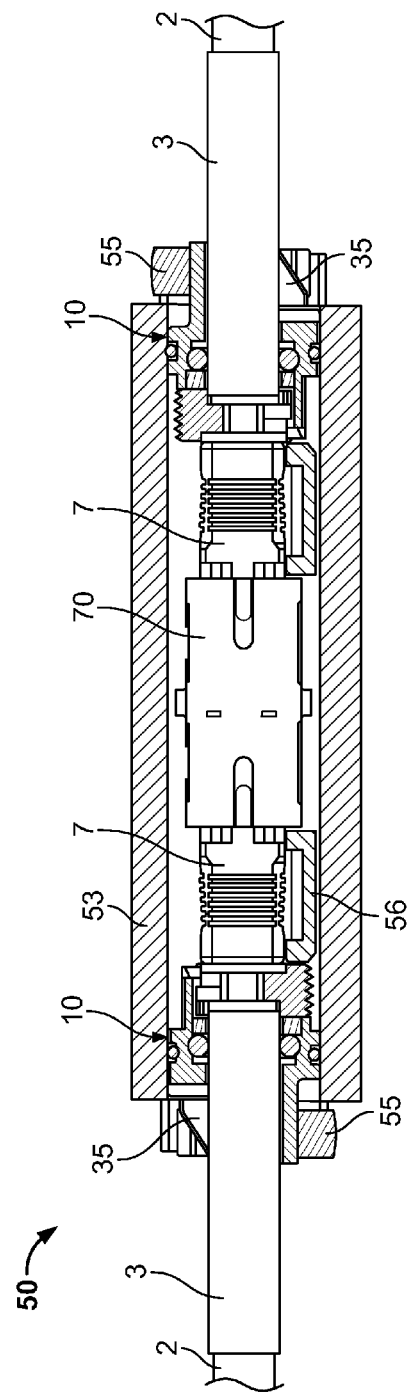
FIG. 6 shows a cross-sectional view of the housing shown in FIG. 5E.
Figure 7C:
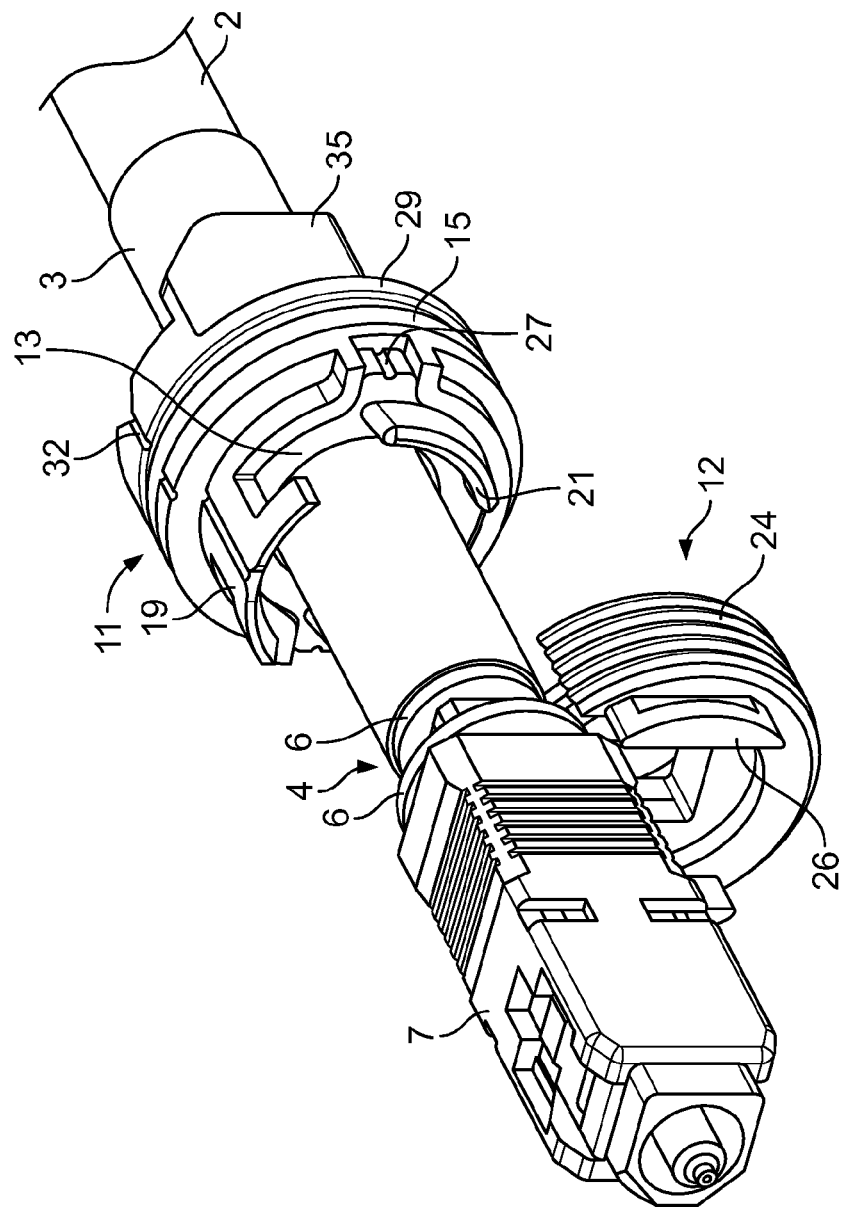

FIGS. 5A to 5E show a perspective side view of a cable sealing and retaining device 50 according to a further embodiment. FIG. 6 shows a cross-sectional view of the cable sealing and retaining device 50. FIGS. 7A to 7C show a perspective side view of the fixation part 12 of the cable sealing device 10 provided with the cable sealing and retaining device 50 in a pre-installed manner on the cable 2 without and with the sealing part 12 receiving the ring part 13. The cable sealing device shown in FIGS. 7A to 7C differs substantially from the cable sealing device 10 shown in FIGS. 1A to 1D by a specific configuration of the fixation part 12 and an outer shape of the sealing part 11. Accordingly, the specific shape of the fixation part 12 and of the sealing part 11 dealt with in the following description of the cable sealing and retaining device 50 is to be regarded in combination with the description made in view of FIGS. 1A to 1D, wherein similar or corresponding parts providing an equivalent function are identified with similar reference signs.

The cable sealing and retaining device 50 comprises a sleeve-shaped housing 53 having two openings 51 at its longitudinal end sides, wherein the housing 53 is adapted to accommodate two cable sealing devices 10, which are each mounted on a connectorized cable 1, and wherein the connectors 7 of the connectorized cables 1 are connected to each other via an adapter 70 inside the housing 53. The connectors 7 are formed of male connectors, wherein the adapter 70 provides female connectors at its longitudinal end sides receiving the male connectors 7, respectively. As shown in FIG. 7C, the cable sealing device 10 has a flange portion 29 with an outer diameter corresponding to an outer diameter of the outer support portion 17 provided for receiving the outer seal ring 15. The cable sealing device 10 may be alternatively combined with the cable sealing device 10 having the flange portion 29 with a larger outer diameter than the outer support portion 17 (see FIG. 1D).

The cable sealing and retaining device 50 further comprises a tension support part 56 formed of a half shell and adapted to receive the connection formed between the connectors 7 and the adapter 70. Particularly, the tension support part 56 comprises three sections, two longitudinal end support sections for receiving the connector part exposed between a longitudinal end side of the cable sealing device 10 and an opposed longitudinal end side of the adapter 70. Between said two longitudinal end support sections, the tension support part 56 comprises a middle section provided for supporting the adapter 70. As particularly shown in FIG. 6, the longitudinal end support sections support the exposed part of the connector 7 and the adapter 70, wherein the support sections, supporting the exposed part of the connector 7, merge towards the middle section by a step portion, thereby providing longitudinal abutment surfaces for the part of the adapter 70 protruding radially from an outer circumferential surface of the connector 7 to an outside thereof.

Figure 5A:
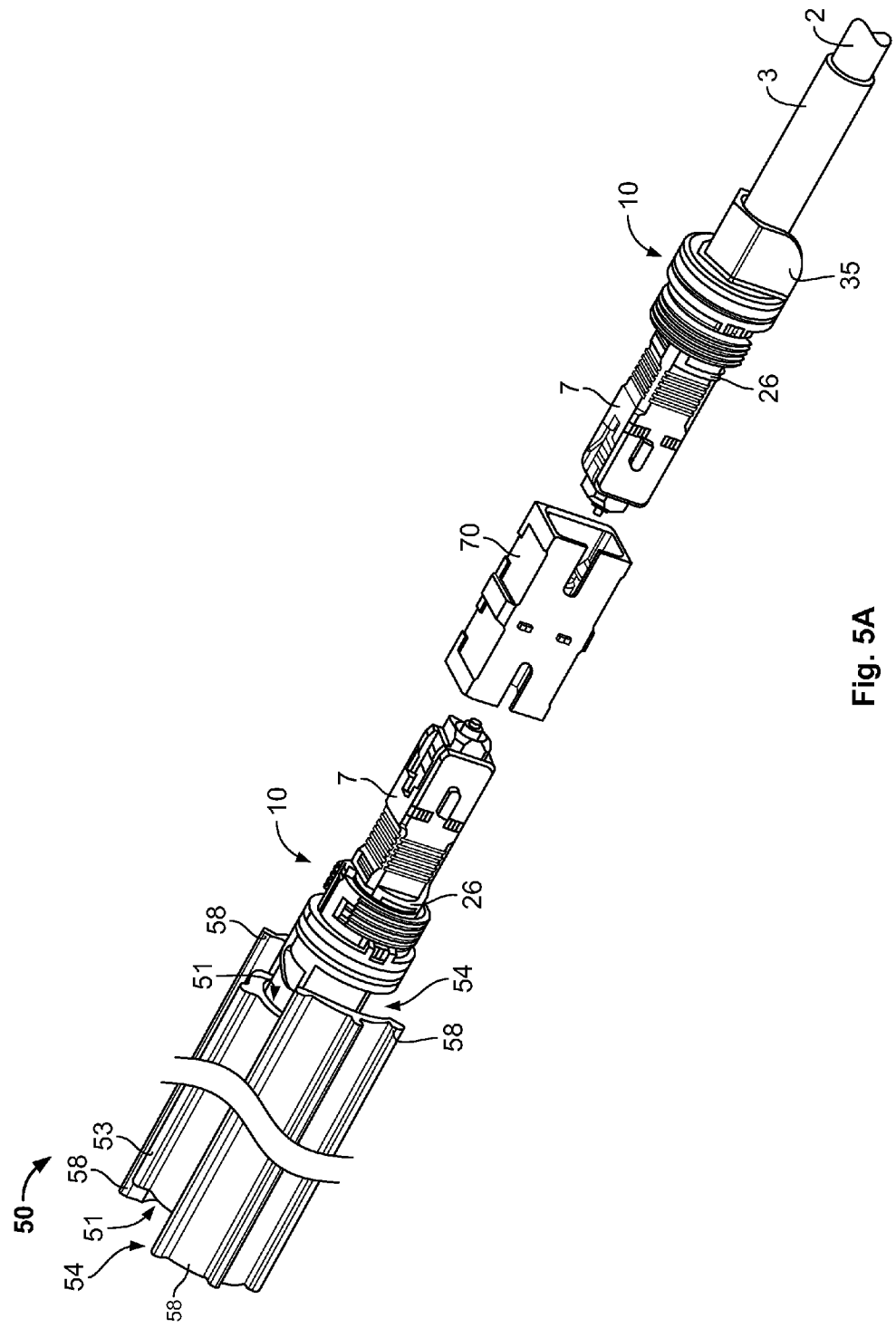
FIGS. 5A-5E show a perspective side view of a cable sealing and retaining device according to a further embodiment in a disassembled and assembled state with two cable sealing devices.
Figure 5B:
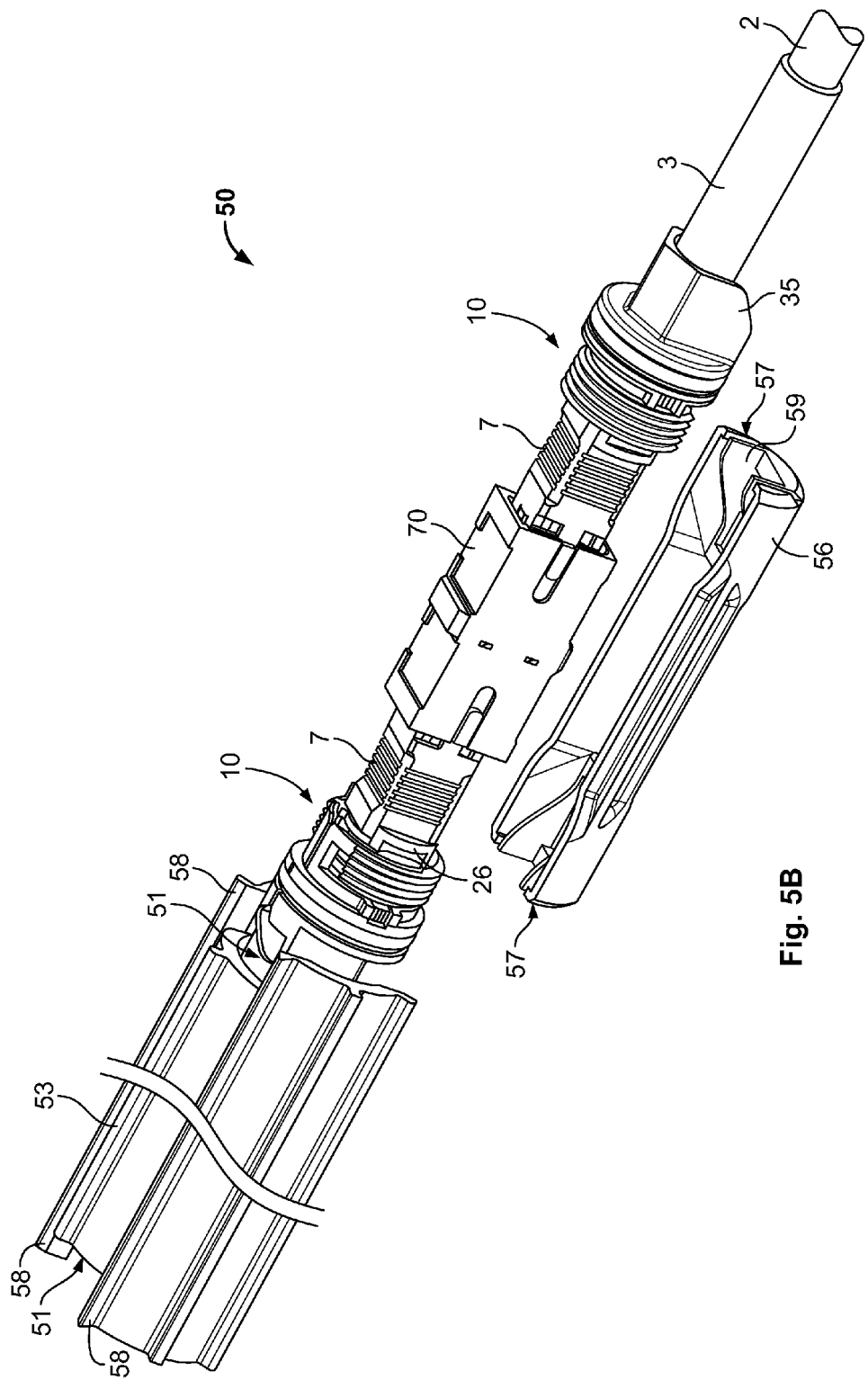
Figure 5C:
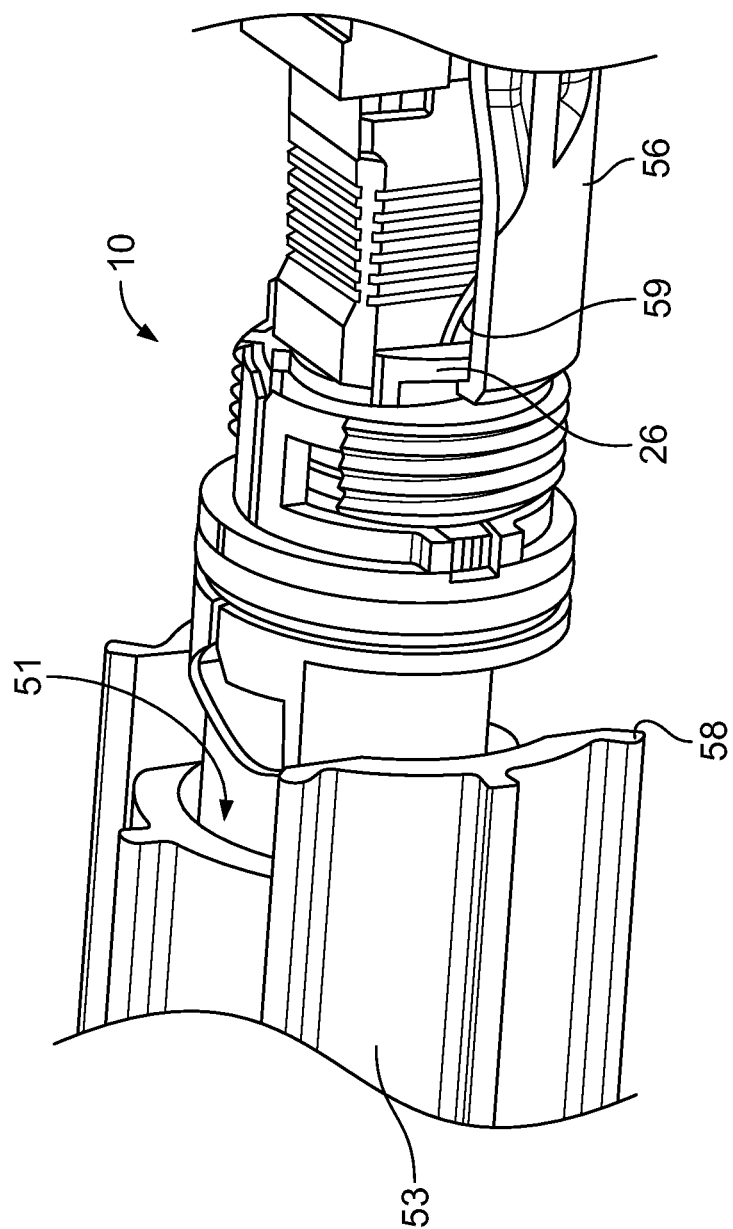
Figure 5D:
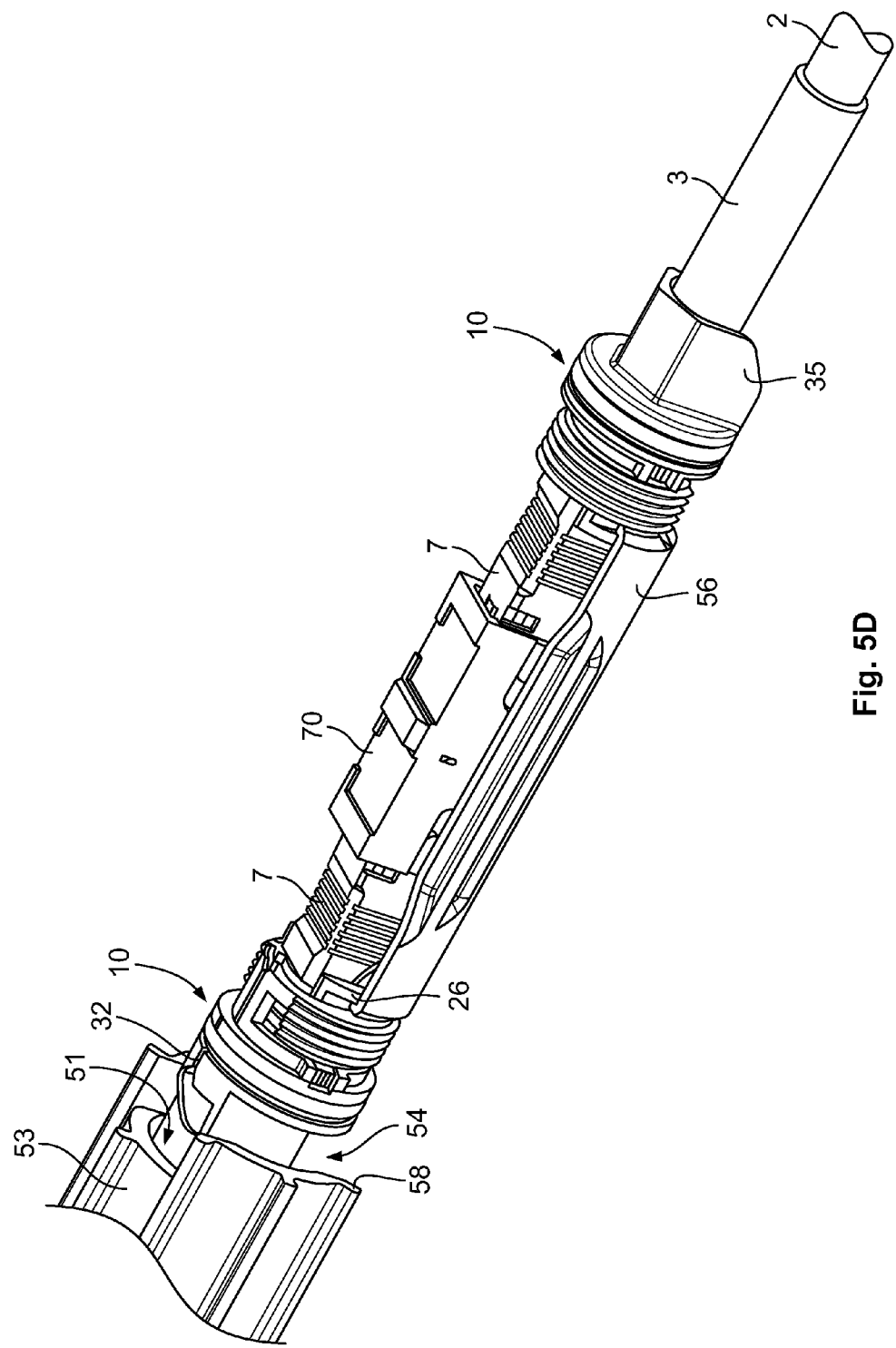

FIG. 5C shows an exploded perspective side view of the cable sealing device 10 connected to the tension support part 56. Particularly and as further shown in FIGS. 7A to 7C, the fixation part 12 has at its longitudinal free end side a protrusion 26 providing a slot extending in a straight direction transverse to the longitudinal direction and which engages an associated key 57 formed by a radial inward projecting flange provided at the longitudinal free end side of the tension support part 56. In this context, instead of the fixation part 12, the attaching part 4, even though not shown in the Figures, may be provided with said protrusion 26 at its longitudinal end surface side directing away from the fixation part 12. In this case, the protrusion 26 may be formed in an area accessible from an outer side and being exposed between a side surface of the connector 7 and the longitudinal end surface of the fixation part 12. Accordingly, the following description of the protrusion 26, the formation thereof at the fixation part 12 and the way of connection to the tension support part 56 may also be transferable, respectively, to a configuration in which the attaching part 4 provides the protrusion 26. Particularly, the fixation part 12 is connected to the tension support part 56 by a key-and-slot configuration providing a positive locking in longitudinal direction of the tension support part 56. Moreover, the tension support part 56 has a support wall 59 arranged on a radial inner side of the tension support part 56 and forming a gap with the key-forming flange for receiving a longitudinal free end section of the protrusion 26. Said longitudinal free end section forms also a flange projecting radially outward of the fixation part 12. In an assembled state of the tension support part 56 with the protrusion 26, the support wall 59 is inserted in a space formed at a radial inner side of the protrusion 26, i.e. in a space formed between the radial inner side of the protrusion 26 and a radial outer side of the connector 7. Thereby, the protrusion 26 is supported in radial direction. In case, the attaching part 4 has the protrusion 26, the tension support part 56 may be formed without the support wall 59.

Due to the provision of the tension support part 56, a tension force caused e.g. by a pulling force acting on the cables 2 in longitudinal direction and normally transmitted to the connection formed by the connectors 7 and the adapter 70, can be bypassed via the fixation part 12 (attaching part 4) to the tension support part 56 from one cable sealing device 10 side to the other one without affecting the connection formed therebetween. In other words, the tension force acting on the cables in longitudinal direction will not be further transmitted to the connection formed between the fixation parts 12 (attaching parts 4). Thus, the pulling force will bypass the connection and the same is reliably retained by means of the tension support part 56 secured at its longitudinal end sides to the fixation parts 12 (attaching parts 4). Moreover, a twist between the cable sealing devices 10, i.e. a turning moment on the connection formed between the connectors 7 is also prevented, since a circumferential move of one cable sealing device 10 will cause always a circumferential move of the other cable sealing device 10 without transmitting the turning moment to the connection between the fixation parts 12 (attaching parts 4) due to the connection of the tension support part 56 to the fixation parts 12 (attaching parts 4), respectively.

Figure 5E:
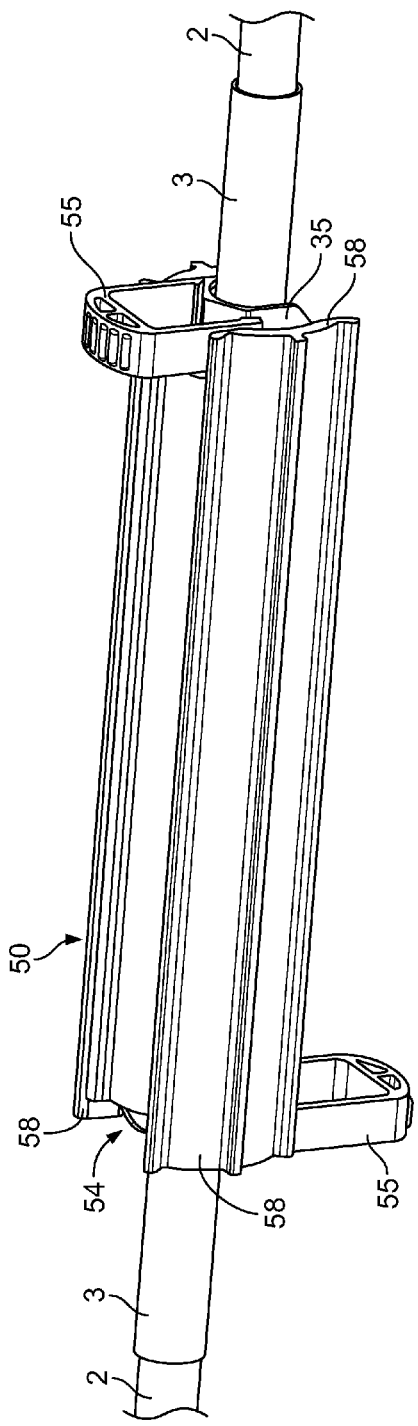

FIG. 5E shows in particular the housing 53 which has at each longitudinal end side, two elongations 58 forming wall projections extending in parallel from the opening 51 in longitudinal direction and forming a recess portion 54 therebetween, which run transverse to the longitudinal direction of the housing 53. The housing 53 has a longitudinal length sufficient to accommodate the cable sealing devices 10 and the connection formed therebetween, wherein the securing formations 35 of the sealing part 11 project the opening 51 in longitudinal direction of the housing 53 between the recess portion 54. The recess portion 54 receives a clip element 55. The clip element 55 is substantially U-shaped and is moved over the securing formation 35 of the cable sealing device 10 to be clamped thereon. The clip element 55 has at longitudinal free end sides of its legs, engaging pawls for engaging behind end sides of the securing formation 35 to radially fix the clip element 55 to the securing formations 35. Since each recess portion 54 receives a clip element 55, the cable sealing and retaining device 50 and the cable sealing devices 10 are secured to each other in longitudinal and in circumferential direction thereof.

An assembling of the cable sealing and retaining device 50 to the cable sealing devices 10 may be performed as follows, for instance. After mounting the cable sealing devices 10 on the connectorized cables 1 in a manner as described above, the housing 53 is moved over one cable sealing and retaining device 10. Then, the connectors 7 are connected to the adapter 70. Thereafter, the tension support part 56 is secured to the protrusion 26 by the key-and-slot configuration as described above. Subsequent thereto, the housing 53 is moved over the connection formed between the cable sealing devices 10 until both outer seals 15 contact the sealing sections 52 of the housing 53, respectively. Then, the clip elements 55 are fixed to the securing formations 35 of the cable sealing devices 10 from a radial outer side to secure the housing 53 extending over both cable sealing devices 10. Thereby, the connection formed between the cable sealing devices 10 is accommodated inside the housing 53 and sealed by the cable sealing devices 10 inserted into the longitudinal end sides of the housing 53. Further, due to the clip elements 55, the housing 53 is secured in longitudinal and in circumferential direction to the cable sealing devices 10.

The cable sealing and retaining device 50 can be disassembled by removing the clip elements 55 and moving the housing 53 from the cable sealing devices 10. The cable sealing devices 10 can be removed from the connectorized cables 1 by releasing the sealing part 11 from the fixation part 12, removing radially the fixation part 12 from the attaching part 4 and breaking the breakage zone 32 of the sealing part 11 to radially remove said sealing part 11 from the connectorized cable 1.

Figure 8:
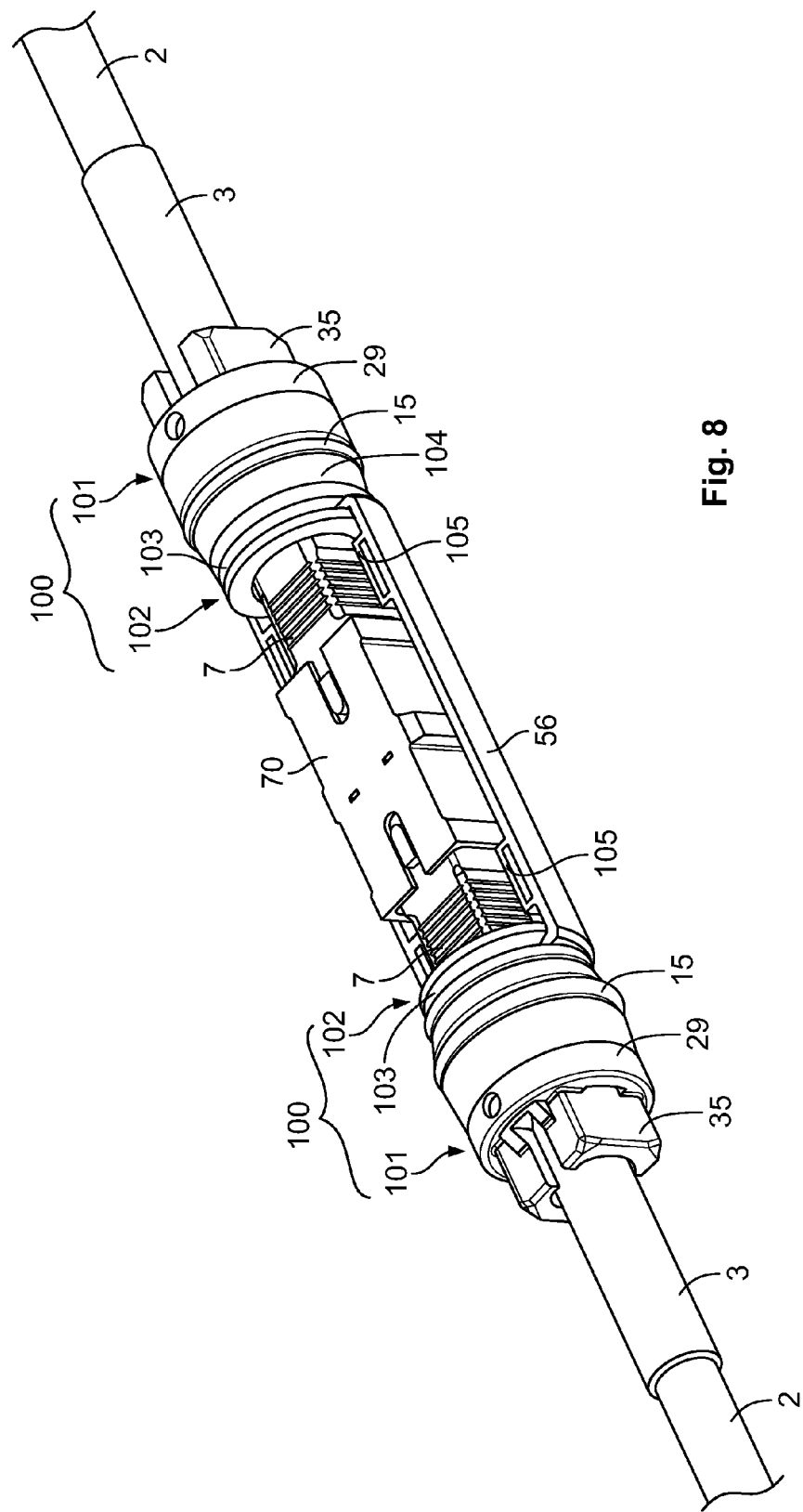
FIG. 8 shows a perspective side view of a cable connection between two cable sealing devices according to a further embodiment usable for a cable sealing and retaining device as shown in FIGS. 5A to 5E.

FIG. 8 shows a perspective side view of a cable connection between two cable sealing devices 100 according to a further embodiment usable for the cable sealing and retaining device 50 as described above. The cable sealing device 100 differs substantially from the above-described cable sealing device 10 by an outer shape of the fixation part 102 and of the sealing part 101. Accordingly, only said specific outer shape will be dealt with in the following, wherein further shapes of the fixation part 102 and of the sealing part 101 relate to shapes of the fixation part 12 and the sealing part 11 described above along with the cable sealing device 10, wherein similar reference signs refer to similar parts and portions, respectively. The fixation part 102 provides an interstice 103 extending in circumferential direction for receiving the key-forming flange of the tension support part 56 from a radial outer side to form the key-and-slot-connection between the tension support part 56 and the fixation part 102. Particularly, the interstice 103 provides at its longitudinal end sides an abutment for the longitudinal surfaces of the key-forming flange of the tension support part 56. Thereby, the positive locking in longitudinal direction between the fixation part 102 and the tension support 56 is achieved. Even though the fixation part 102 is shown of a ring shape, the fixation part 102 can adopt any shape suitable for providing the interstice 103. Accordingly, the fixation part 102 may be formed of a C-shaped and connected to the sealing part 102 as described above. Furthermore, the fixation part 102 may be formed of two parts mounted on the attaching part from a radial outer side and connected to each other by latching means, for instance. The sealing part 101 provides an outer shape adapted to the outer shape of the fixation part 102 in order to allow securing therebetween at least in one longitudinal direction side, for instance, by abutment. As shown in FIG. 8, the sealing part 101 has a conical portion 104 between the fixation part 102 and the outer seal 15, wherein an outer diameter of the conical portion 104 decreases in longitudinal direction from the outer support portion of the sealing part 101, which supports the outer seal 15, until the fixation part 102 is reached. According thereto, the sealing part 101 provides a continuous crossing between an outer surface of the fixation part 102 and an outer surface of the outer support portion supporting the outer seal 15. Thus, the housing 53 can be moved in longitudinal direction over the fixation part 102 and the sealing part 101 until the outer seal 15 contacts the sealing section 52 provided inside the housing 53 without getting stuck.

As further shown in FIG. 8, the half-shell shaped tension support part 56 provides abutment portions 105 for abutting against outer sides of the connector 7 in the mounted state of the tension support part 56. The abutment portions 105 projects an inner surface of the tension support part 56 towards the connector 7 side, i.e. towards the longitudinal axis of the tension support part 56. The tension support part 56 provides the abutment portions 105 at opposing sides of each connector 7 received by the tension support part 56. Accordingly, the tension support part 56 abuts in circumferential direction against each side of the connector 7, which is covered by the tension support part 56. In other words, the tension support part 56 is adapted to receive the connector 7 in a fitted manner. Additionally, the abutment portion 105 provides abutment surfaces in longitudinal direction to further improve a positive locking in said direction.

Figure 9:
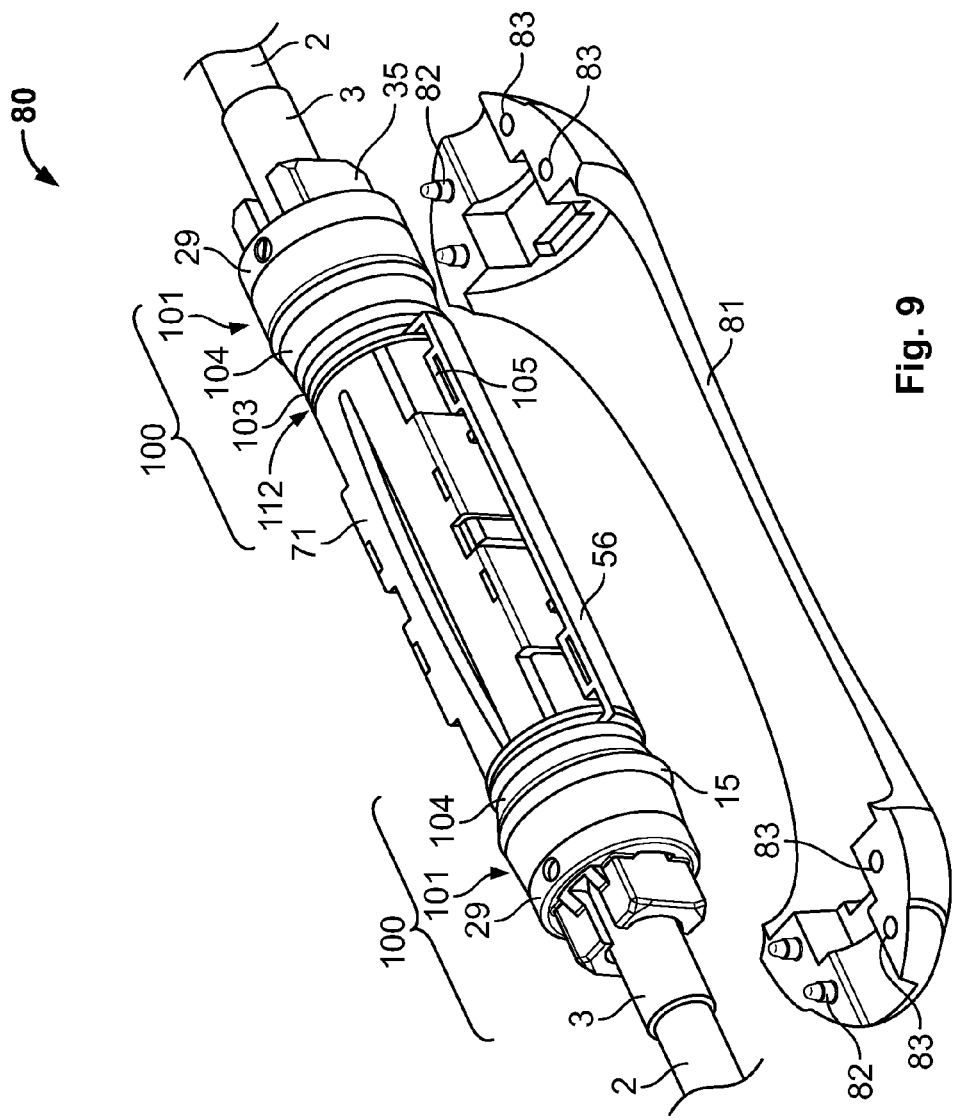
FIG. 9 shows a perspective side view of a cable sealing and retaining device according to a further embodiment in a disassembled with two cable sealing devices according to a further embodiment connected to each other.

FIG. 9 shows a perspective side view of a cable sealing and retaining device 80 according to a further embodiment provided with two cable sealing devices 100. Same reference signs relate to corresponding portions and parts described above. The cable sealing and retaining device 80 comprises two cable sealing devices 100, each comprising a fixation part 112 which differs from the above-described fixation part 102 by omission of the interstice 103. The interstice 103 is formed between longitudinal end sides of an adapter 71 which extends between the fixation parts 112 of the cable sealing devices 100 and a corresponding longitudinal end side of the fixation part 112. Particularly, the cable connection provided between the longitudinal end sides of the cable sealing devices 100 and radially supported by the tension support part 56 is covered by the adapter 71 having a longitudinal length smaller than a longitudinal distance formed between facing longitudinal end sides of the fixation parts 102. The adapter 71 provides a longitudinal length corresponding to a longitudinal distance between opposing inside surfaces of the key-forming flanges provided with the tension support part 56. Accordingly, the adapter 71 fits into the tension support part 56 between the key-forming flanges formed at longitudinal end sides of the tension support part 56. As the tension support part 56 has a longitudinal length corresponding to a longitudinal distance formed between facing longitudinal end sides of the fixation part 112, the interstice 103 with a longitudinal width adapted to receive the key-forming flange from the radial outer side is formed between the longitudinal end side of the adapter 71 and the facing longitudinal end side of the respective fixation part 112.

The cable sealing and retaining device 80 comprises a housing formed by identical shaped housing halves 81 connectable to the cable sealing devices 100 form a radial outer side. Each housing half 81 provides at its longitudinal end sides support sections for radially supporting the heat shrink tube 3 and the rear end side of the sealing part 101 providing the securing formations 35. Thus, the support sections has an inner surface profile matching an outer surface profile of the heat shrink tube 3 and of the rear end portion of the sealing part 101 comprising the securing formations 35. The housing halves 81 are connected to each other by a pin-hole-connection provided at the longitudinal end sides adjacent to the support sections. Particularly, each longitudinal end side of the housing half 81 provides pins 82 and pin-receiving holes 83 adjacent to the support sections in a radial outward direction with respect to the longitudinal axis of the housing half 81. The pins 82 have an outer shape adapted to press-fit into associated pin-receiving holes 83 to secure the two housing halves 81 against each other.

Figure 10:
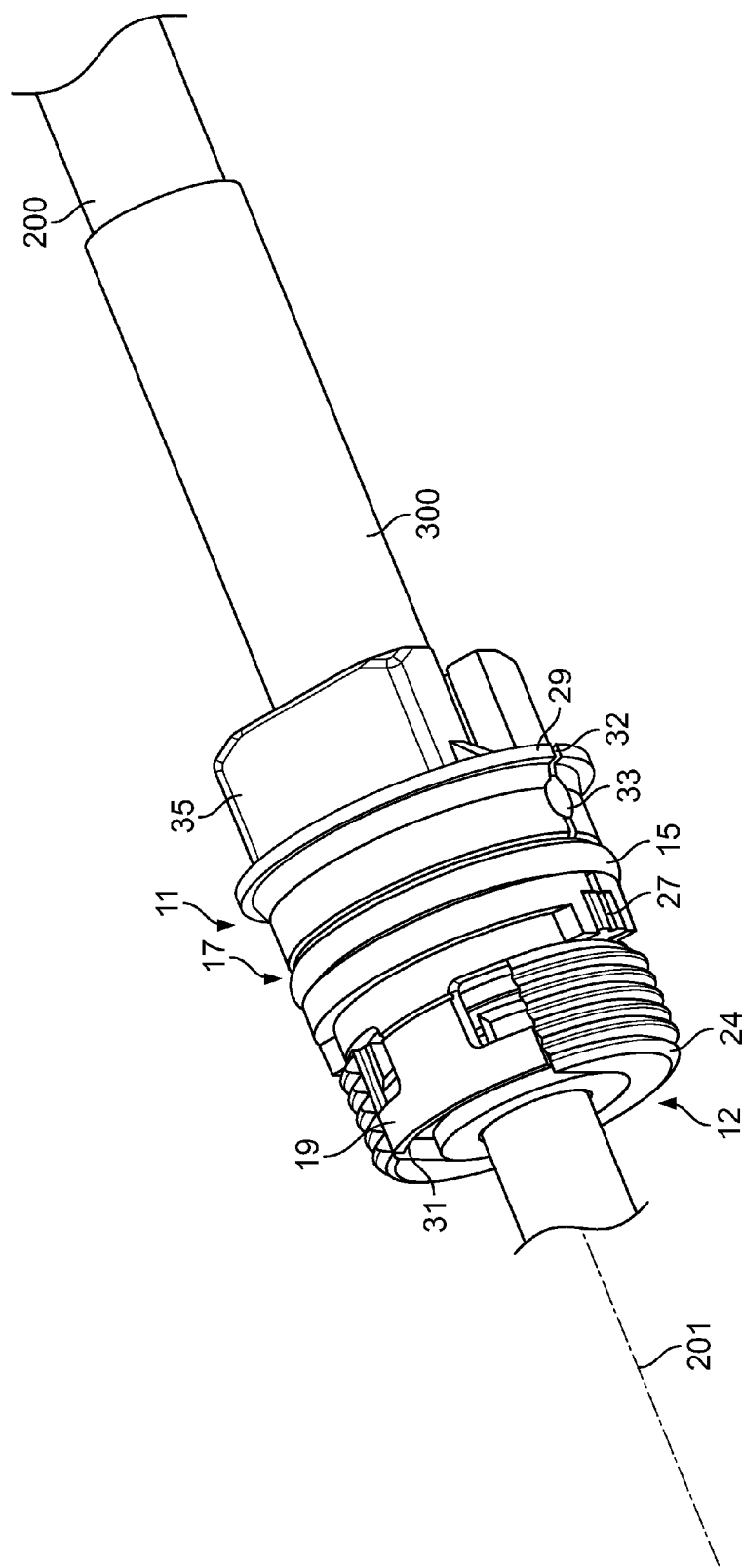
FIG. 10 shows a perspective side view of a cable sealing device according to another embodiment in an assembled state.

FIG. 10 shows a further embodiment of a connection of the cable sealing device 10 to a cable 200. Same reference signs refer to similar parts as described above. The cable sealing device 10 is particularly mounted on the cable 200 guiding a signal transmitting element 201 and joint to a connection portion of the attaching part at least by means of a heat shrink tube 300, wherein the cable 200 does not be provided with a connector at a longitudinal free end side portion projecting from the fixation part 12. The longitudinal free end side portion of the attaching part provides a connection end 202 by which the cable 200 may be further operated. However, the present invention is not to be construed as to be limited thereto. The attaching part may be generally provided with or without such a connection end and/or with or without the protrusion 26 as described above. Accordingly, the attaching part differs from the attaching part shown particularly in FIGS. 1A to 1D by omission of the connector. Hence, the connector does not form a necessary part for mounting the cable sealing device 10 on the cable 2. The cable sealing device 10 may be mountable on any kind of cables in order to retain and/or seal the cable guidable therethrough.

In view of the above, the present invention has been described with reference to specific preferred embodiments. However, a combination of one or more parts as described along with one preferred embodiment with one or more parts as described along with another described preferred embodiment is also feasible.

REFERENCE LIST 1 connectorized cable
2, 200 cable 3, 300 heat shrink tube
4 attaching part
5, 6 positive locking face
7 connector
10, 100 cable sealing device
11, 101 sealing part
12, 102, 112 fixation part
13 ring part
14 inner seal ring
15 outer seal ring
16 inner support portion
17 outer support portion
18 first securing means
19 second securing means
20 opening
21 longitudinal protrusion
22 notch
23, 33 cavity
24 external thread
26 protrusion
27 ring part
28 receptacle
29 flange portion
30 circumferential incision
31 tip end
32 breakage zone
34 gap
35 securing formations
40, 50, 60, 80 cable sealing and retaining device
41, 51, 61 opening
42, 52, 62 sealing section
43 internal thread engagement
44 pulling attachment member
45 through hole
46, 53 housing
47, 67 sleeve portion
48 flat surface portion
49 accommodating section
54 recess portion
55 clip element
56 tension support part
57 slot
58 elongation
59 support wall
63 lock nut
64 wall mounting
70, 71 adapter
81 housing half
82 pin
83 pin-receiving hole
103 interstice
104 conical portion
105 abutment portion
201 signal transmitting element
202 connection end

The invention claimed is:

1. A cable sealing and retaining device for an optical fiber cable comprising:
 a fiber optic connector terminating the optical fiber cable, the fiber optic connector including a connector body and a release sleeve disposed around the connector body, the connector body having a front end at which an optical ferrule is disposed and a rear end including an attachment feature to which strength members of the optical fiber cable are crimped;
 a fixation member disposed on the optical fiber cable to surround the attachment feature, the fixation member being configured to axially secure the cable sealing and retaining device to a port;
 a cable seal disposed around the optical fiber cable; and
 a second member slidably disposed on the optical fiber cable, the second member including a retention feature that axially secures the second member to the fixation member, the second member being disposed around the cable seal when the second member is axially secured to the fixation member, a front end of the second member having a larger circumference than a rear end of the second member.

2. The cable sealing and retaining device of claim 1, wherein the second member has a largest circumference that is larger than a largest circumference of the fixation member.

3. The cable sealing and retaining device of claim 1, wherein the fixation member defines an axial passage open at opposite forward and rearward ends.

4. The cable sealing and retaining device of claim 1, wherein the second member defines an axial passage open at opposite forward and rearward ends.

5. The cable sealing and retaining device of claim 1, wherein the fixation member includes a securing member having a forward facing abutment surface and wherein the retention feature of the second member has a rearward facing abutment surface that engages the forward facing abutment surface when the second member is axially secured to the fixation member.

6. The cable sealing and retaining device of claim 5, wherein the fixation member has two securing members and wherein the retention feature of the second member has two rearward facing abutment surfaces that each engage one of the two securing members when the second member is axially secured to the fixation member.

7. The cable sealing and retaining device of claim 1, wherein a forward end of the second member is disposed rearwardly of a forward end of the fixation member.

8. The cable sealing and retaining device of claim 1, wherein the fixation member includes threads to axially secure the cable sealing and retaining device to a port.

9. The cable sealing and retaining device of claim 8, wherein the threads are external threads.

* * * * *